United States Patent [19]

Huff et al.

[11] 4,383,298

[45] May 10, 1983

[54] PLANT MAINTENANCE CONTROL SYSTEM

[75] Inventors: Robert G. Huff, Satsuma; John O'Neill, Daphne, both of Ala.

[73] Assignee: Ciba-Geigy Corporation, Ardsley, N.Y.

[21] Appl. No.: 139,041

[22] Filed: Apr. 10, 1980

[51] Int. Cl.³ .............................................. G06F 9/00
[52] U.S. Cl. .................................. 364/300; 364/200; 364/403; 364/464
[58] Field of Search ................ 364/300, 200 MS File, 364/900 MS File, 401, 403, 406, 464, 468, 496, 364/107

[56] References Cited

U.S. PATENT DOCUMENTS

| | | | |
|---|---|---|---|
| 3,226,683 | 12/1965 | Gaffney | 364/200 |
| 3,273,129 | 9/1966 | Mullery et al. | 364/900 |
| 3,900,834 | 8/1975 | Casey et al. | 364/200 |
| 3,916,387 | 10/1975 | Woodrum | 364/200 |
| 4,042,912 | 8/1977 | Bachman et al. | 364/300 |
| 4,186,438 | 1/1980 | Benson et al. | 364/200 |

Primary Examiner—Leo H. Boudreau
Attorney, Agent, or Firm—Karl F. Jorda; John F. Ohlandt

[57] ABSTRACT

A plant maintenance control system designed to be effectuated through use of a computer; the basic aspect of the system relates to the unique results obtainable through particular operations performed by the computer based upon the unique organization and arrangement of the so-called data base complex, such that efficient and detailed control of maintenance expenses for a complicated chemical plant or the like can be readily established.

18 Claims, 23 Drawing Figures

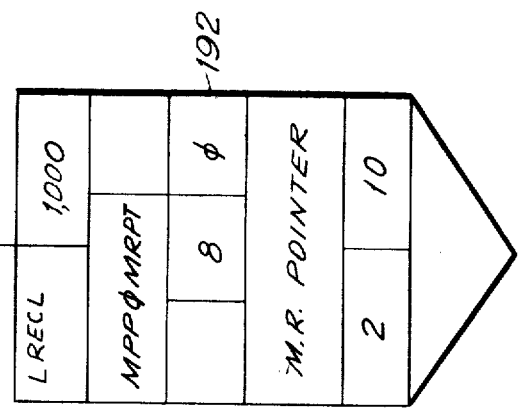

FIG. 18

INVENTORY INDEX DATA BASE

| LRECL | OCCUR/DB 600 | DSG |
|---|---|---|
| NAME IIPØROOT | | FILLER |
| PREFIX | DATA | |
| | INVENTORY INDEX ROOT | |
| AVG. PARENT 1.0 | | MAX. PARENT 1.0 |

| | 25,000 | |
|---|---|---|
| IIPØMIPT | | |
| | INVENTORY POINTER | |
| 45 | | 300 |

FIG. 13

AUDIT DATA BASE

| LRECL | OCCUR/DB | DSG. |
|---|---|---|
| NAME MCPØROOT | | FILLER |
| PREFIX | DATA 64 | |
| | ON-LINE UPDATE AUDIT ROOT | |
| AVG. PARENT 1.0 | | MAX. PARENT 1.0 |

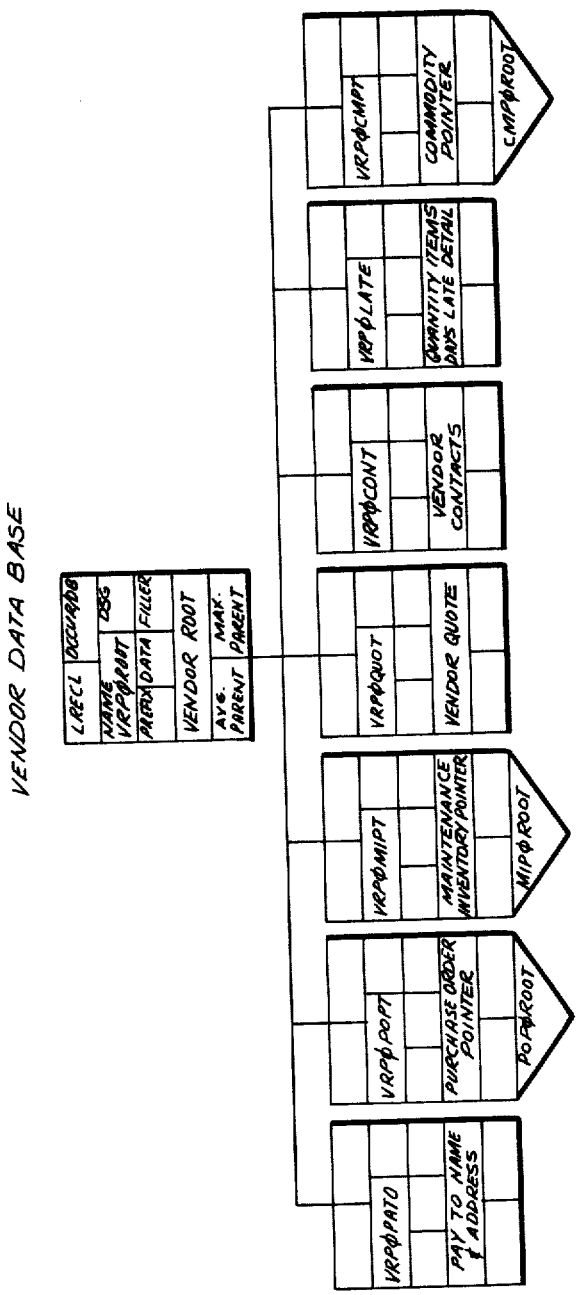

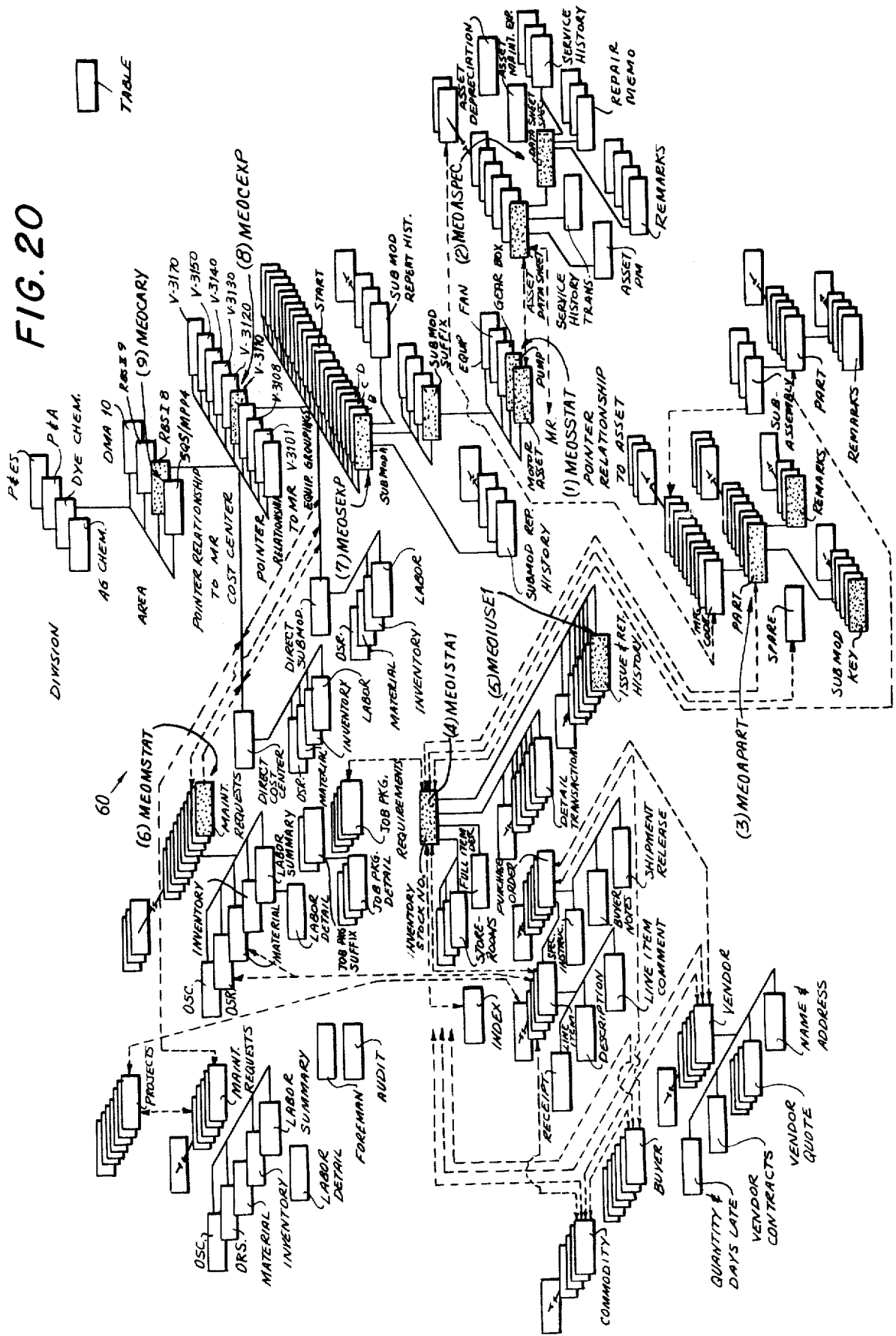

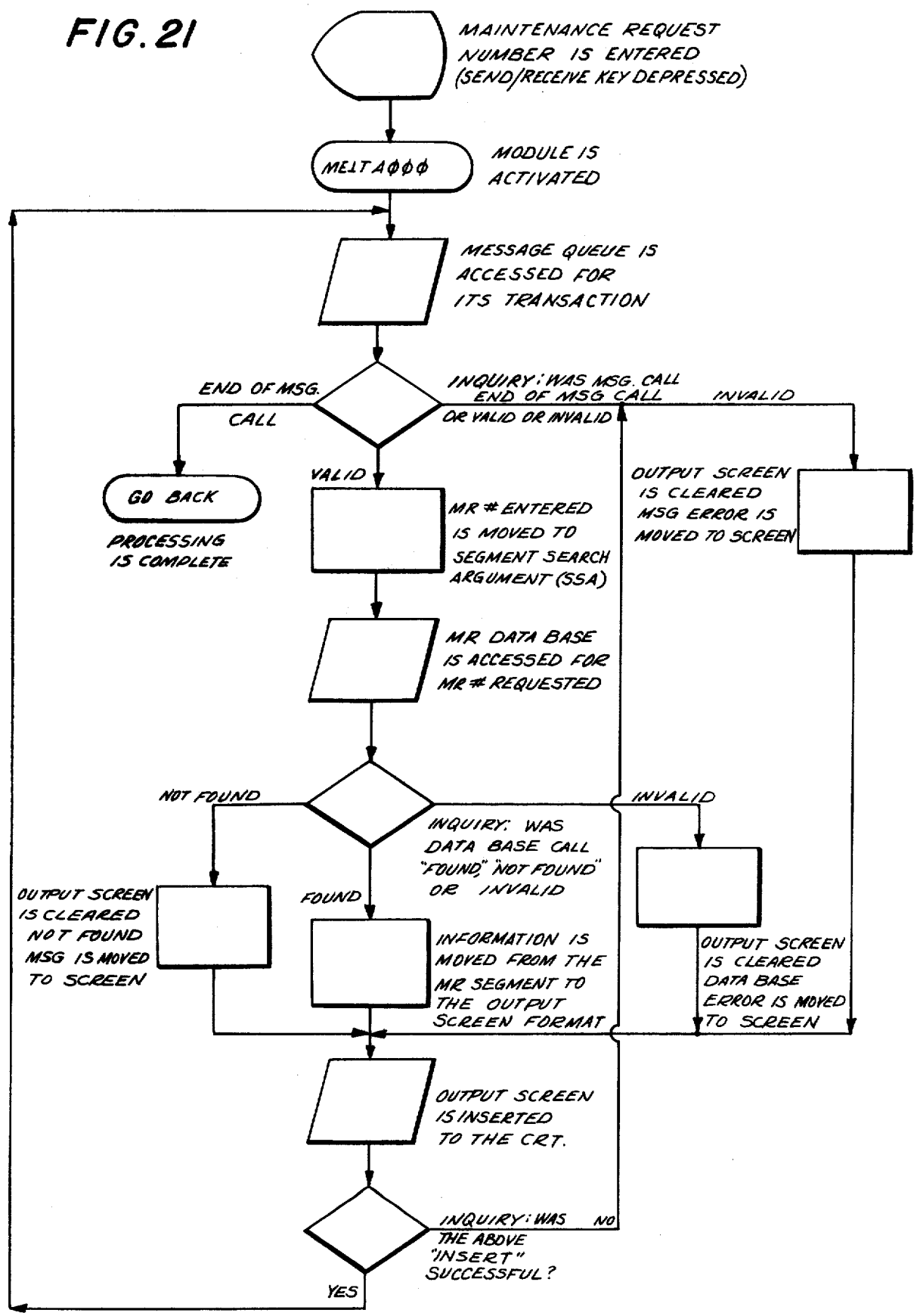

| M.R.NO | MAINTENANCE REQUEST | CONTROL NO. |
|---|---|---|
| | CIBA-GEIGY CORP DATE | 008852 |

| cost center | project no. | service no. | f/asset no. | type maint. | PRIORITY | DATE NEEDED |
|---|---|---|---|---|---|---|
| | | | | | | |

| TITLE: | | | |
|---|---|---|---|
| DESCRIPTION: | LABOR GROUP | STD CODE | LABOR HRS. |
| | | | |

| YES NO ☐ ☐ SAFETY CHECK REQ'D | ANALYSTS CODE | ESTIMATED INVENTORY | ⌊⌊⌊⌊⌊⌊⌊•⌋ |
|---|---|---|---|
| | | ESTIMATED MATERIALS | ⌊⌊⌊⌊⌊⌊⌊•⌋ |
| req. by-and date | mgt. approval | ESTIMATED O/S REPAIRS | ⌊⌊⌊⌊⌊⌊⌊•⌋ |

FIG.22

HISTORICAL REPAIR DATA CARD                        SERVICE NUMBER

M.R.NO._____ AREA_____ COST CENTER_____ DATE_____
OLD F.A. NO._____ NEW F.A. NO._____ DATE COMPLETED_____
SERVICE TITLE_____

| work performed code | | PROBLEM CODE | | | | PART CODE | | | | | |
|---|---|---|---|---|---|---|---|---|---|---|---|
| 1 | adjusted | 1 | bent | 13 | plugged | 1 | actuator | 21 | gauge | 41 | screen |
| 2 | balanced | 2 | broken | 14 | poor workmanship | 2 | agitator shaft/blades | 22 | guide | 42 | screw |
| 3 | cleaned | 3 | burned | 15 | seized | 3 | bag packer | 23 | grid | 43 | seal-mech |
| 4 | inspected | 4 | corroded | 16 | torn | 4 | base/foundation | 24 | head | 44 | seal-oil |
| 5 | modified | 5 | dull | 17 | vibrating | 5 | bearing | 25 | housing | 45 | seat |
| 6 | not worked | 6 | failed | 18 | warped | 6 | belt | 26 | hub | 46 | shaft |
| 7 | overhauled | 7 | improper lubrication | 19 | worn | 7 | blower | 27 | impeller | 47 | sheave |
| 8 | pitted | 8 | leaking | | | 8 | bolt | 28 | insulation | 48 | shoe |
| 9 | repaired | 9 | loose | | | 9 | bushing | 29 | knife | 49 | sleeve |
| 10 | replaced | 10 | mis-aligned | | | 10 | cable | 30 | knocker band | 50 | spray bar |
| 11 | secured | 11 | no problem | | | 11 | chain | 31 | lines (specify) | 51 | sprocket |
| 12 | welded | 12 | noisy-rough | | | 12 | condenser | 32 | motor | 52 | sub-assy |
| | | | | | | 13 | coupling | 33 | oil | 53 | strainer |
| Aligned | Yes☐ No☐ check one | | | | | 14 | cover | 34 | oiler | 54 | tension-bar |
| Emergency | Maintenance Foreman | | | | | 15 | crusher | 35 | packing | 55 | tube |
| PM | Employee Number | | | | | 16 | filter/cloth | 36 | pin | 56 | valve |
| Scheduled | Area☐ PM☐ Shift☐ | | | | | 17 | gasket | 37 | pulverizer | 57 | vari-drive |
| Downtime_____ Hrs_____ Min_____ | | | | | | 18 | gear | 38 | ring | 58 | vessel |
| Misc. Info. | | | | | | 19 | gearbox | 39 | rollers | 59 | vibrator |
| | | | | | | 20 | guard | 40 | ruptured disc | 60 | other(specify) |

FIG.23

PLANT MAINTENANCE CONTROL SYSTEM

BACKGROUND, OBJECTS AND SUMMARY OF THE INVENTION

The present invention relates to a plant maintenance control system and in particular to the exploitation of a computer in such context as a technological tool to enable strict and enforceable controls over the maintenance expenses involved in a complicated and expensive plant such as a chemical plant.

It has been known to establish certain controls over maintenance expenses in complicated plants, but generally this has been effectuated by means of a primarily batch-oriented system. In particular, it has been the experience of the inventor of the present system to work in a chemical plant with a batch-oriented system primarily designed to monitor and report departmental labor utilization as an upper management control. However, with such a system, relatively little provision is made to monitor material utilization and outside repair expenses. The relative importance of the aforementioned elements of cost may be broken down as follows: labor wages generally constitute about 42% of the total cost, whereas, maintenance materials constitute about 46%, and outside repairs 12%.

From the above percentages, it will be understood that the prior system or systems have lacked the facility for monitoring the very significant portion, that is, the approximately 58% of total costs, and, accordingly, have been deficient for these reasons. In addition, a system that is batch-oriented has severe drawbacks, particularly in that a significant time must elapse before results can be achieved and it is incapable of providing immediately the important information affecting decision-making with respect to the utilization of certain items. For example, one often wants to know immediately the history of the maintenance performed on certain equipment so that decisions can be made as to the future use of components that appear to be in constant need of maintenance.

Accordingly, the present invention is directed to a fully integrated data base system; that is, one that uniquely establishes, organizes and arranges the individual physical data bases, and further, uniquely provides logical interrelationships that produce an efficient information system given the variety of parameters involved.

Inasmuch as the system of the present invention is envisioned for use with IMS (Information Management System), a fully integrated system offered by IBM, reference can be made by way of background material to IBM disclosure materials on this subject, such as Access Method Services Manual; IMS/VS Version 1 Utilities Reference Manual; IMS/VS Version 1 Message Format Service Users Guide; BTSII/Batch Terminal Simulator II Program Description and Operations Manual; IMS/VS Version 1 Application Programming Reference Manual; and IMS/VS Version 1 System/Application Design Guide.

The terms used in the present specification will, for the most part, correspond with terms used in that IBM data base system. As is generally understood, certain standard terminology already accepted in the computer industry will also be utilized herein; as for example, "bits", which are grouped into ∓bytes" or characters, characters being grouped into fields, etc. However, in accordance with the general scheme of IMS, which is based on the development of a special data language known as DL/I, fields are grouped into segments and segments are the nodes of tree structures. By "tree structure" is meant a well-known structure in accordance with a so-called hierarchical approach, as can be appreciated by reference to a standard work, such as "Database" by David Kroenke (published 1978 by Science Research Associates, Inc.), particularly to page 15 et seq.; 210 et seq., where a variety of definitions are given. A particular tree structure is referred to as a data base record and a complete data base is composed of a plurality of data base records, which may be occurrences of the same record type or of several record types.

Fundamental to an understanding of the present invention are the basic principles of so-called data base processing. One of these principles is integration of data by which is meant that the data is processed as an integrated whole. Also, all of the data is compatible since the "files" have been created by a data base processing system, that is to say, a common system. Another important feature of data base processing is the elimination or reduction of data duplication. In a conventional file processing system, data is likely to be recorded in several different files, whereas in a data base system, it need only be recorded once. Such elimination of duplication saves file space and can reduce processing requirements. Moreover, elimination of duplication can result in data integrity, whereas in conventional arrangements, it's possible to change the data in one place or file, but not in another, such that data items may differ and result in conflicting reports issuing as a result of the system's operation.

It should be noted that the DL/I model utilized in the Information Management System marketed by IBM provides for two types of data base records: physical data base records (PDBR) and logical data base records (LDBR). A PDBR is a hierarchy of segments that physically exist. One example of this can be appreciated by reference to page 23 of the aforenoted work by Kroenke entitled, "Database". An LDBR is a logical, or symbolic, hierarchy of segments. An LDBR differs from a PDBR in either or both of two ways. An LDBR may be sensitive to a subset of the segments in a PDBR. The second potential difference between an LDBR and a PDBR is that the LDBR may logically connect two or more PDBR's.

It is also important to note that IMS includes its own internal data communications processor which performs the needed communications between the user and the data base, it being understood that generally speaking, there are three components involved in data base processing: the user or his application programs, the system support software, and the data base itself. This can be appreciated by the graphical presentation shown on page 9 of the Kroenke work. By the term "user", one is not referring to a particular individual but to a group of individuals whose primary orientation to the data base is use. These users can interact with so-called application programs which in turn use the data base system. When users interact directly, they use English-like statements known as query language.

A primary object of the present invention is to design the total data base in an optimal way such that complete control over plant maintenance expenses can be established, whereby total costs will be minimized. This is accomplished through a unique arrangement of relationships among the individual data bases which together constitute the total storehouse of data on the significant parameters involved in plant maintenance. By reason of these relationships, flexible and timely access to the data can be gained so as to yield the requisite information by which the necessary control can be realized. This particular object and its fulfillment will become clear as the description proceeds.

The primary goal of the maintenance function—keeping the physical plant in a safe, economical operating condition—depends to great measure on the timely availability of detailed information of:

(a) current demand for services, (b) relative priority of individual jobs, (c) identification of required materials, (d) availability of materials, and (e) craft requirements along with probable duration.

As maintenance functions increase in size and complexity from small to large, it becomes increasingly more difficult and expensive to gather, collate, analyze, and distribute the required information. Additionally, the effects of an increasing rate of technological change tends to negate the benefits of prior personal experience.

This system of the invention was designed to be modular in its application but with provision to inter-relate the various modules in a machine logic which replicates the traditional inquiry without the redundance of manual files or stand-alone systems. The system obtains its daily information from hourly personnel time sheets, purchase requisitions, and storeroom withdrawal authorizations. This information, along with a chart of accounts and cost center, is required to satisfy internal cost accounting requirements. By capturing this information at its lowest level of detail, it is then convenient for cost trends to be analyzed to any degree of detail required.

Individual machines or groups of machinery which perform a discrete function are identified and cross referenced to both specific asset numbers and plant layout drawings. These machinery groupings are in turn cross referenced to the cost center definitions and product cost sheets. The system incorporates a work order system which is inter-related to the other modules and provides the current status of work in process and preliminary planning. The data provided by vendors relative to performance characteristics and spare parts requirements for specific pieces of machinery are inter-related to the asset files and the plant layout drawings. The spares requirements are in turn interrelated to the spares inventory modules which, via stores stock numbers, are inter-related to a purchasing system.

Other major objects of the system of the present invention are to provide on-line editing and updating with respect to the activity or maintenance request orders.

Another object is to provide on-line retrieval of the history of maintenance request orders.

A further object is to enable the maintenance analyst or foreman involved in maintenance to monitor and control cost rather than just report expenses. In other words, the present invention gives maintenance control a "before the fact" visibility and reporting rather than being just an "after the fact" system.

Still another object is to provide greatly increased accuracy in the cost data obtainable.

The system of the present invention has been applied in a complicated plant as noted previously; that is to say, in a chemical plant which employs on the order of one thousand or more people and involves invested capital of hundreds of millions of dollars. In such environment, it is of crucial importance that a maintenance control system, that is, a system which is designed to monitor and control plant maintenance expenses, be a thoroughly efficient one. In actual application, the system of this invention has effected over-all savings of the order of one million dollars per year. This highly advantageous cost savings has been accomplished because of the aforenoted detail control which the system provides over maintenance materials and outside repairs that constitute major components in the total cost picture. In other words, while formerly only wages were efficiently monitored as an upper management control, the present invention goes beyond that and enables up-to-the-minute monitoring of materials and outside repairs, as well as of wages attributable to plant maintenance activities.

In fulfillment of the aforenoted objects, a primary feature of the present invention resides in the unique arrangement by which logical relationships are established among the plurality of individual data bases that are provided; in other words, broadly stated, the primary feature fully exploits the capability of known data systems so as to enable an integrated data collection; further, to permit display and "print out" of the required information that will provide control over the lowest level of detail on maintenance requests and the like. For example, it permits pin-pointing the fact that certain cost centers may not be adhering to their budgets or that certain equipment, as indicated by the information from the SUBMOD data base, is not performing satisfactorily. The parts, for example, are wearing out too quickly; specifically, the maintenance department can look to see if emergency repairs on pump seals, as an example, are occurring too frequently, and can check on the total cost of this.

It should be noted that in the chemical plant in which an embodiment of the present invention has been implemented, the number of maintenance requests per day that are involved may average one hundred and the number of transactions per maintenance request may average as much as eighty. Although in the implemented system not all cost centers will accept maintenance charges, there are 270 separate cost centers that do so and the number of SUBMODS is of the order of 6500, while the maintenance projects average 250. By the term "SUBMOD" is meant a functional group of components, such as a pump and the motor which drives the pump, which group is assigned a service number.

The maintenance control system of the present invention has been developed in several stages because of its complexity. Consequently, the primary feature of the present invention alluded to above resides in the initial phase or the "maintenance request phase" of the system. Thus, emphasis will be placed on the fundamental logical pointer relationships among the maintenance request data base, the maintenance project data base, the cost center data base, and the so-called SUBMOD data base, these four data bases forming the total data base complex of the initial phase. Subsequently, as the initial phase "proved out", further data bases, numbering twelve in all, were added to the system and these will be explained as the description proceeds. In a similar way, the added data bases have also been completely integrated, with each other and with those of the initial phase, by means of logical pointer relationships so that a whole variety of access points are available to one accessing the data base complex. Again, this will be fully explained in the later parts of the specification.

Other and further objects, advantages and features of the present invention will be understood by reference to the following specification in conjunction with the annexed drawing, wherein like parts have been given like numbers.

BRIEF DESCRIPTION OF THE DRAWING

FIGS. 4-19 are schematic diagrams of the various individual data bases, particularly illustrating the logical tree structures involved in each;

FIG. 20 is a diagrammatic showing of the entire data base complex;

FIG. 21 is a flow chart illustrating a series of operational steps resulting from a particular program.

FIG. 22 illustrates a typical maintenance request form.

FIG. 23 illustrates a card containing the historical repair data.

DESCRIPTION OF PREFERRED EMBODIMENT

Figure 1:
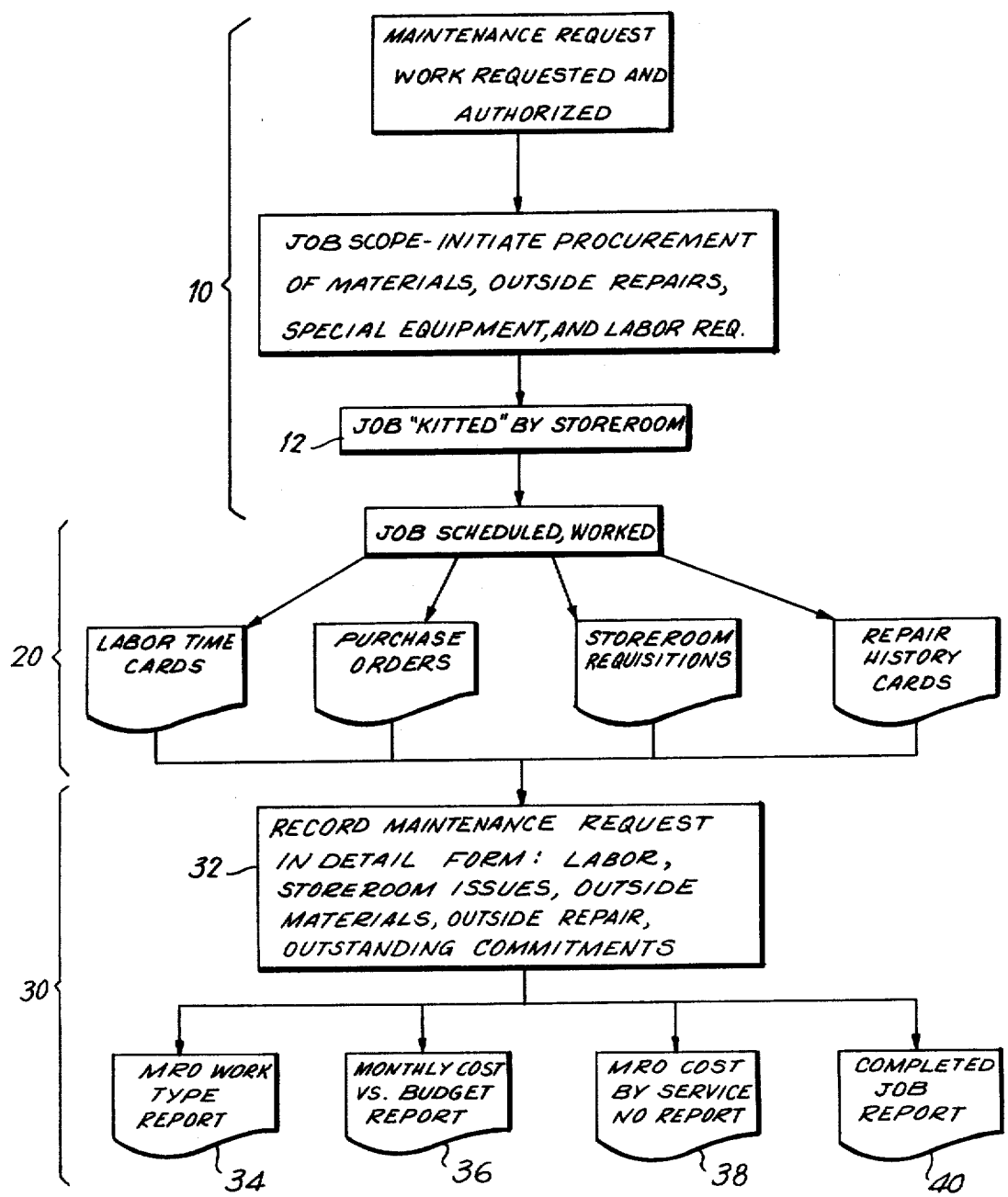
FIG. 1 is a flow chart diagram which provides an overview of the entire maintenance control system of the present invention.

Referring to FIG. 1, there is illustrated in flow chart form the complete environment in which the present invention functions. The maintenance control system of the present invention is operative in an environment which can be broken down into three main stages or portions. As illustrated, the first stage, designated 10, comprehends the maintenance request, initiation and scheduling phase. In such phase, a request is made of the maintenance department to correct some problem that has come to the attention of someone in the plant. The maintenance department reviews the request to determine the extent of labor and material needed and schedules the job. Any such request of the maintenance department, for example, for repair, overhaul, engineering change, etc., for any item within the plant is made by the production foreman or other authorized individual through the completion of a maintenance request. The maintenance request form includes such information as the request number, the cost center and project numbers, as well as a service or SUBMOD number, and asset number. Also, indication is made of the title of the request and the description of the action to be performed, the priority assigned, and the labor group involved; as well as estimates of the inventory required, and the materials and outside repairs, if necessary. The noted information is contained on a card shown in FIG. 22. FIG. 23 shows a card which contains the historical repair data, being filled in for each maintenance request completed so as to provide a hard copy repair history. The card of FIG. 23 is used to update the particular data base with a recap information at the SUBMOD level.

It will be understood that a maintenance analyst is assigned to the task of reviewing and setting the aforenoted priorities for the job to be performed and of initiating procurement of materials, etc., and for jobs scheduled. As indicated in the third box 12 of the stage 10, the job is "kitted" by a storeroom from appropriate catalogs and data sheets.

Once the job has been scheduled and assigned a priority, the prerequisite labor time card, purchase orders, storeroom requisitions, as well as the repair history cards already alluded to, are prepared, the actual job scheduling and working being indicated in stage 20 in the flow chart of FIG. 1. The stage designated 30 in FIG. 1 indicates the data processing operations and the reports issuing therefrom.

The fundamental scheme of the present system permits an on-line inquiry capability through the maintenance analyst so that he can have a complete detailed breakdown of all past maintenance repairs performed on the disabled item or items. As indicated at the bottom of FIG. 1, in general schematic or flow chart form, the various input documents are used to record maintenance requests data in detail form such as indicated by block 32. Exemplary output documents or reports are indicated at 34, 36, 38 and 40, it being understood that a whole variety of reports can be generated as a result of the scheme of the present invention.

In particular, once all the data from all the various input sources already discussed has been recorded as indicated by block 32, several methods become available to the maintenance analyst to interrogate the data base or data base complex. This will also be understood by reference to FIG. 2 in which it is generally indicated that a number of departments within the plant, namely, maintenance, production and accounting, have their own CRT "smart" terminals 50 and that the data base complex designated 60 may typically be interrogated by, for example, the aforenoted maintenance analyst in order to display at his terminal 50 all of the maintenance requests performed against a particular service number within the current year. As a result of such an interrogation, a complete breakdown indicating planned and actual labor and material is displayed upon the CRT at terminal 50. With this information available the analyst can determine if a similar occurrence happened in the past. The actual labor hours and materials that were used on previous maintenance requests can aid him in defining accurate time and cost estimates for the new request.

If it turns out the material must be purchased, or in the event that outside repair is necessary, the maintenance analyst prepares a suitable purchase requisition and forwards the requisition to the purchasing department. If the material required is maintained as part of inventory in the plant storeroom, stock requisition slips or orders are prepared for the parts. The storeroom will package all parts in a kit for use when the job is to be performed. It will be remembered that in FIG. 1 such job knitting by the storeroom was indicated.

Figure 3:
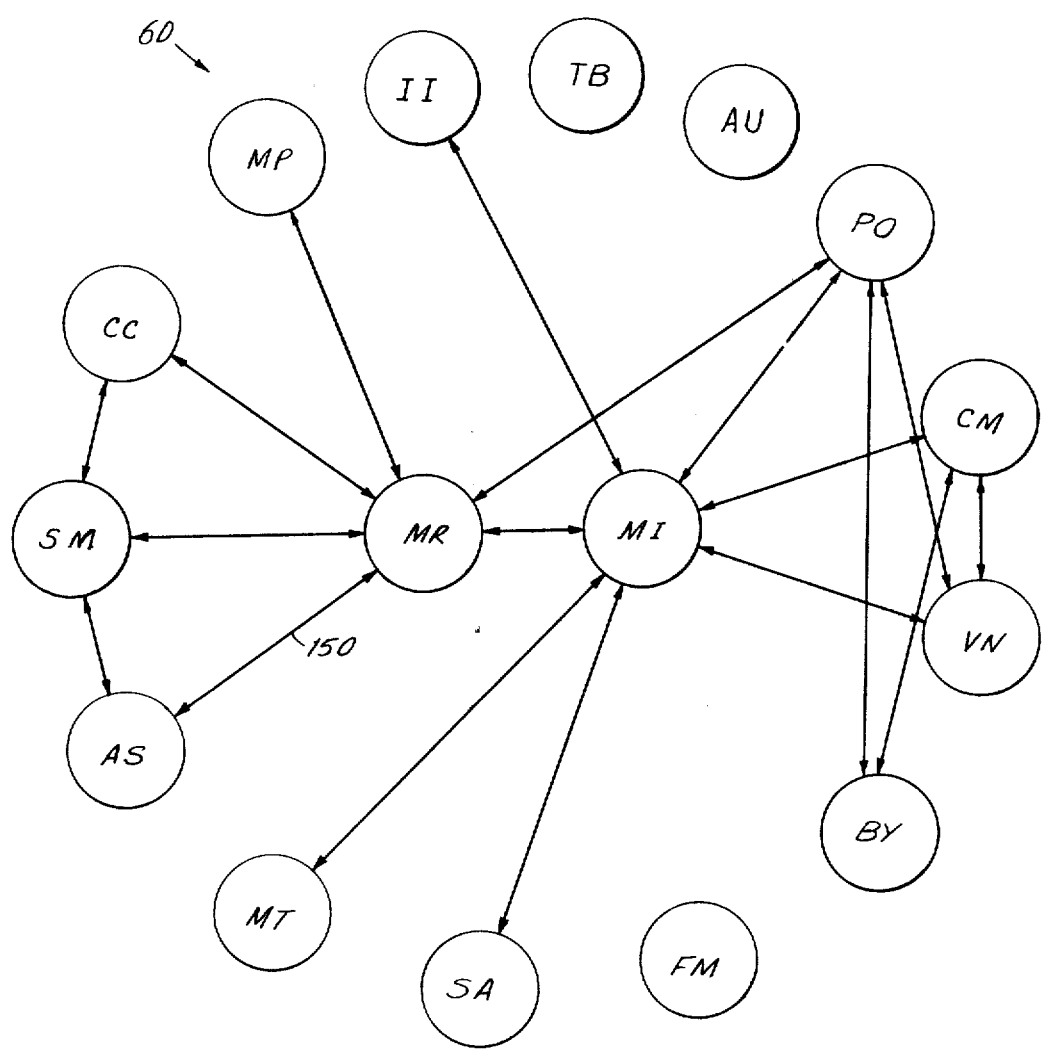
FIG. 3 is a block diagram illustrating the interrelationships among the group of data bases forming the complete data base complex utilized in the present invention.

Significantly, at this time the maintenance analyst adds the maintenance request and all associated data that has been prepared to the data base complex depicted in FIG. 3. Such activity is also indicated as a step in the over-all system seen in the flow chart of FIG. 1, being designated 32. The addition of the data to the data base complex is accomplished via the aforenoted on-line CRT at the appropriate terminal 50. Typical entries into the data base complex 60 are the following:

Maintenance Request Number
Control Number (Reference to actual MR document)
Cost Center
Service Number (SUBMOD)

Project Number
Fixed Asset Number
Priority
Analyst Identification
Maintenance Type
Date Requested
Date Written
Estimated Expenses (Labor, Material, and Outside Repair)

As noted above, before a job can be started, all materials must be available in the job kit. In the event outside purchases are to be made, the purchase order information will be used to update the data base with the expense projections for the committed amount if a purchased item, repair part or services is involved. Upon receipt of the particular invoice from the vendor the Accounts Payable Department matches the invoice and the purchase order and updates the data base with the paid amount.

As also indicated in FIG. 1, the various documents involved in the scheduling and working of a job are made out, such as labor time cards as well as the aforenoted purchase orders and storeroom requisitions. In addition, the repair history cards are prepared.

Upon completion of a given project, the foreman in charge of that project will complete a maintenance requisition and return it to the maintenance analyst who will update the status of the project in the data base complex 60. The maintenance request cannot be closed until all payments are made for received goods or outside services. In other words, any maintenance requests have an open status until such conditions are fulfilled.

Figure 2:
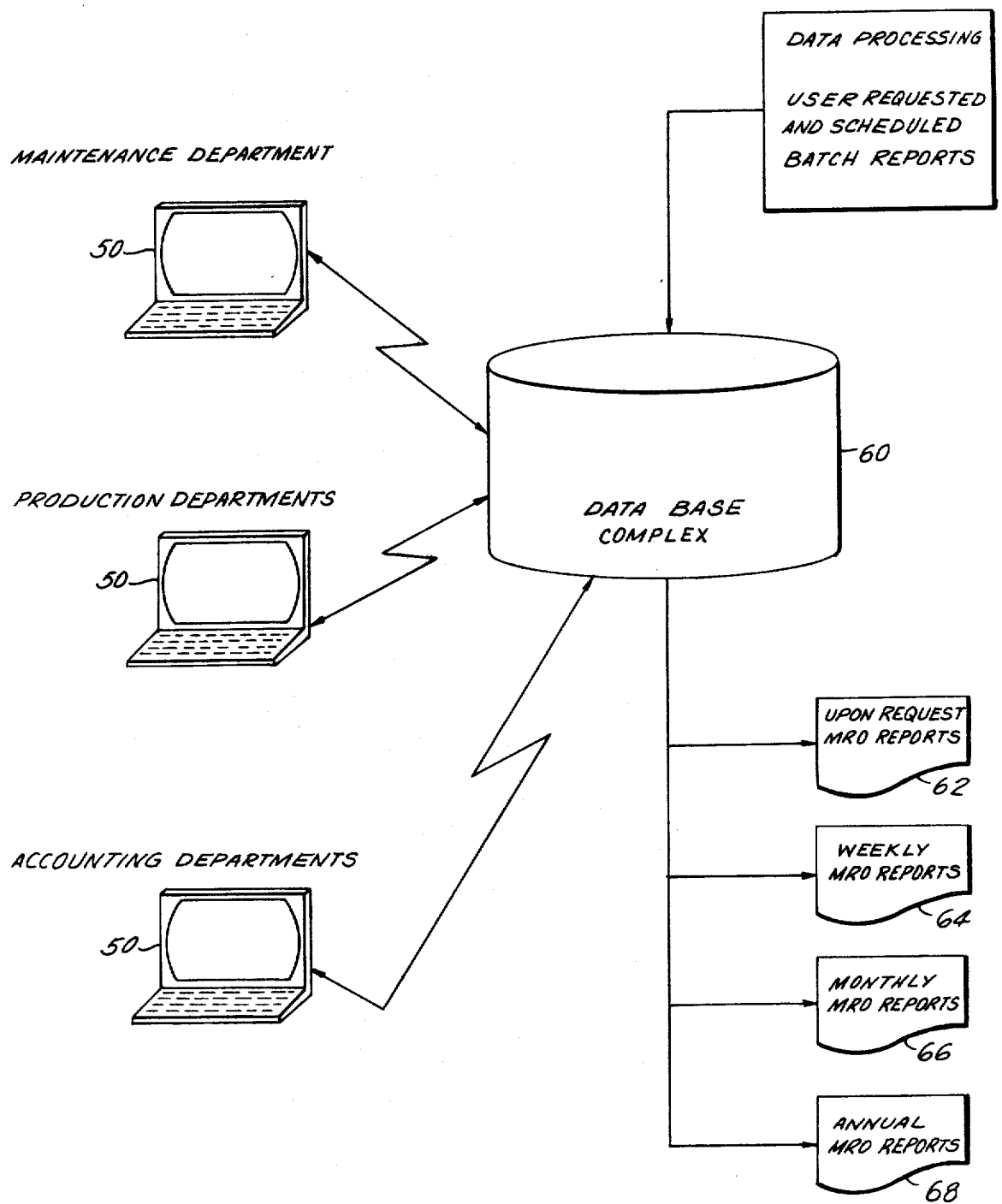
FIG. 2 is a block diagram illustrating a particular portion, namely, the information and control portion of the system, which comprises the data processing aspect of the invention.

Referring to FIG. 2, this illustrates the information and control portion of the system, which is the heart of the system in accordance with its concepts of the present invention. This information and control portion supports the day-to-day operation of the maintenance control function, and currently there are over sixty-five different on-line transactions available to the different departments organized within the complex chemical plant whose maintenance activities are being monitored. Currently in an actual embodiment there are over sixty-five different on-line transactions available to the maintenance department, production department and several accounting department areas, as schematically indicated in FIG. 2, for the purpose of timely updating, and information inquiries made, of the data base complex 60. Access to the data base complex 60 is flexible and there are multiple points of access to virtually any element of data restored on the "files". It will be remembered that in a data base system and particularly one in accordance with the present invention, the operative terms with respect to data structure are fields, segments and records.

As has been indicated, maintenance requests are either categorized as expenses or capital investments. In the latter case, the items involved are assumed to have a substantial life in use. All maintenance requests involving expenses and some of the capital maintenance requests are associated with a cost center. This feature will become clearer as the description proceeds. In addition, all production cost centers have service items (SUBMOD) which can point to repair history and such repair history includes all level of detail such as the following:
Labor charge to maintenance request.

Maintenance foreman and labor group responsible for repair.
All maintenance and labor group employees who worked on the repairs by the particular day.
Materials used for repair.
Outside services required.

Information such as that listed above is available through any "leg" of the data base complex, and a request can be made on a summary basis or on the lowest level of detail desired. When a request is made for information at a terminal 50 (FIG. 2), the user may have the required information displayed on a suitable CRT. Alternatively, the information can be obtained by way of a hard copy of printout. As another alternative, a request can be submitted to the data processing department for one of several pre-defined package reports that are regularly printed on a 24-hour turn around basis. There are also included in the system a series of scheduled weekly, monthly and annual reports, as also indicated and designated 64, 66, 68 in FIG. 2.

On a weekly basis, all maintenance requests that are "backlogged" due to non-receipt of purchased material, overrun on planned estimate, etc. are printed. This report is vital to the maintenance department to ensure that cost overruns are minimized and all repairs are expedited efficiently. There are 25 monthly reports generated for use within the maintenance department as a result of the operation of the system of the present invention. Typical of the reports produced are:
Labor Distribution by Cost Center
Directory of all MR's on the Data Base
Service Number Status Report-Year-to-Date
Maintenance Expense by Area
Closed Maintenance Project Summary
Labor Distribution by Labor Group
Foreman Efficiency Report
Outside Repair by MR
Purchased Material by MR
Inventory Issues by Stock Number With all of the above information made available to the maintenance department, and particularly due to the flexibility to access the maintenance request data in a timely fashion, the maintenance department is able to gain better control over cost of repairs. In other words, through the system of the present invention, which is specifically applied to the problem of plant maintenance control, maintenance costs are constantly monitored and much greater maintenance efficiency is realized than was possible previously.

Referring now for the moment to FIG. 3, there is illustrated a block diagram useful in conveying the concept of the relationships established in accordance with the present invention between individual data bases. The entire interrelationship or arrangement of data bases is termed a data base complex. Four of these individual data bases constitute the arrangement first implemented in accordance with the initial phase of the system of the present invention. Thus, these individual data bases are designated MR (Maintenance Request), MP (Maintenance Project), CC (Cost Center) and SM (SUBMOD). Logical pointer relationships in accordance with the present invention are established and these are indicated in solid lines (having arrows indicating both directions of communication). The names of the other data bases shown are given below:
FM Foreman TB Table
AS Asset/Data Sheet
MT Manufacture Table
MI Maintenance Inventory
PO Purchase Order
CM Commodity
VN Vendor
BY Buyer
AU Audit
II Inventory Index
SA Sub-Assembly It should be noted that a particular data base as depicted in FIG. 3, such as for example, the maintenance request data base shown in the circle MR, is defined as a collection or assemblage of all the data base records of the same type or different types relating to the subject of maintenance requests.

As will be understood, the concept of data bases is not restricted to records which are physically grouped together. For this reason, when the term data base is employed throughout this specification, without a modifier, then "logical data base" is meant. These various logical data bases, including their code designations, are defined as follows:

MEL0001, TABLE DATA BASE—The logical Table data base is comprised of segments contained in the physical Table data base. The primary functions of the Table data base are to provide the editing standard for critical codes and data items used in one or more data bases in the maintenance expense system and to provide common descriptive information for these codes. Although the Table data base is defined as having only one segment type, a two byte code in the key of the segment differentiates the ten types of data to be viewed. No expense information is maintained in this data base.

MEL0002, FOREMAN DATA BASE—The logical Foreman data base is comprised of segments contained in the physical Foreman data base. The Foreman data base accumulates month-to-date and year-to-date totals of the actual hours supervised by a foreman. These totals are broken out by the source of the hours as follows:
direct cost center
direct to SUBMOD
direct to maintenance request In addition, rolling twelve month totals of actual hours supervised and efficiency hours are maintained in the data base. The Foreman data base also serves as the editing standard for foreman related data throughout the maintenance expense system.

MEL0003, MAINTENACE PROJECT DATA BASE—The logical Maintenance Project data base is comprised of segments from the following physical data bases:
Maintenance Project data base
Maintenance Request data base The primary function of the Maintenance Project data base is to maintain, in summary, the total expenditures of the maintenance department to a capital project. The only way in which charges can be accumulated to a project is through a maintenance request. All summary totals in the Maintenance Project data base are substantiated by the detail transactions maintained in the Maintenance Request data base. The Maintenance Project data base also serves as the editing standard for project related data throughout the maintenance expense system.

MEL0004, MAINTENANCE REQUEST DATA BASE—The logical Maintenance Request data base is comprised of segments from the following physical data bases:
Maintenance Request data base
Cost Center data base
SUBMOD data base
Maintenance Project data base
Asset data base
Maintenance Inventory data base
Purchase Order data base Two primary functions of the Maintenance Request data base are to accumulate, in summary total and by detail transaction, all expenditures by the Maintenance Department required to complete a job. All summary totals for a maintenance request are substantiated by detail transactions. A secondary function of the Maintenance Request data base is to maintain this expense data and status information for historical reference. The Maintenance Request data base serves as the editing standard for all maintenance request related data throughout the maintenance expense system.

MEL0005, SUBMOD DATA BASE—The logical SUBMOD data base is comprised of segments contained in the following physical data bases:
SUBMOD data base
Cost Center data base
Maintenance Request data base
Asset data base The SUBMOD data base serves two primary functions. The first of these is to accumulate maintenance expenses to a functional group of equipment. In order to accomplish this, the SUBMOD data base accumulates expense data from two sources:
direct to SUBMOD
direct to Maintenance Request Expense totals for direct SUBMOD charges are substantiated by detail transactions maintained in the SUBMOD data base. Expense totals for direct maintenance request charges are substantiated by detail transactions maintained in the Maintenance Request data base. The second primary function of the SUBMOD data base is to define the functional group of equipment in terms of the fixed assets which make up that group. A secondary function of the SUBMOD data base is to maintain, through non-expense transactions, a history of problems and repairs to the fixed assets in a SUBMOD. All data in the SUBMOD data base is maintained for reference purposes. The SUBMOD data base serves as the editing standard for all SUBMOD related data throughout the maintenance expense system.

MEL00006, COST CENTER DATA BASE—The Logical Cost Center data base is comprised of segments contained in the following physical data bases:
Cost Center data base
Maintenance Request data base
SUBMOD data base The primary function of the Cost Center data base is to accumulate all maintenance expenses to a particular function within the plant. In order to accomplish this, the Cost Center data base accumulates and maintains expense summary totals from three sources:
direct to cost center direct to SUBMOD
direct to maintenance request Each of these expense summary totals is substantiated by detail transactions maintained in their respective data bases. The Cost Center data base also accumulates capital expenditures through charges made to capital maintenance requests.

MEL0007, MAINTENANCE INVENTORY DATA BASE—The logical Maintenance Inventory data base is comprised of segments from the following physical data bases:
Maintenance Inventory data base
Vendor data base
Purchase Order data base
Maintenance Request data base
Commodity data base
Manufacturing Table data base
Inventory Index data base
Sub-Assembly data base
Buyer data base The functions of the Maintenance Inventory data base are to accumulate detail information for each stock item in the storeroom, and to accumulate the usage of a stock item such as the number issued to-date and number on hand as of today. It also accumulates the daily detail transactions performed against a particular stock item, where it is located, the full item description and issue and issue return history.

MEL0008, PURCHASE ORDER DATA BASE—The logical Purchase Order data base is comprised of segments from the following physical data bases:
Maintenance Inventory data base
Vendor data base
Maintenance Request data base
Commodity data base
Maintenance Project data base
Cost Center data base
Buyer data base Purchasing department's purchase order forms are created using the Purchase Order data base. This data base accumulates year-to-date information pertaining to the purchase orders required to aid the purchasing department in supplying the storeroom and various departments in the plant.

The data base has line item receipts, descriptions, comments, line item releases, special instructions, buyer notes and shipping addresses segments.

MEL0009, ASSET/DATA SHEET DATA BASE—The logical Asset/Data Sheet data base is comprised of Segments contained in the following physical data bases:
Manufacturing Table data base
SUBMOD data base
Maintenance Request data base The primary functions of the Asset/Data Sheet data bases are:
(1) Maintain an asset's service history thru detail transactions. Maintain an asset's preventative maintenance information. Accumulate an asset's expense history and depreciation.
(2) Maintain specifications as related to a specific motor, speed reducer, pump, fan or equipment type grouping. Maintain a group of remarks, repair memos and service history as related to a specific motor, speed reducer, pump, fan or equipment type grouping.
(3) Maintain where this asset is located and its manufacturer.

MEL0010, AUDIT DATA BASE—The logical Audit data base is comprised of segments contained in the physical Audit data base. The primary function of the Audit data base is to provide a record of the various departments which made additions, deletions and changes to the various sensitive data bases in the system. No expense information is maintained in this data base.

MEL0011, MANUFACTURE TABLE DATA BASE—The logical Manufacture Table data base is comprised of segments from the following physical data bases:
Maintenance Inventory data base
Sub-Assembly data base
Asset data base The primary function of the Manufacture Table data base is to keep track of the parts, parts definition, detail remarks, where the part is used and all spares available for a specific piece of equipment such as a motor, pump, speed reducer, fan or equipment grouping by each manufacturer.

MEL0012, COMMODITY DATA BASE—The logical Commodity data base is comprised of segments from the following physical data bases:
Vendor data base
Maintenance Inventory data base
Buyer data base The primary functions of the Commodity data base are to answer the following:
(1) What vendor supplies this commodity?
(2) Is this commodity in the storeroom and, if it is, where is it, and how many do we have?
(3) How many buyers buy this commodity?

Another primary function of the Commodity data base is to provide an editing function for other data bases.

No expense information is maintained in this data base.

MEL0013, BUYER DATA BASE—The logical Buyer data base is comprised of segments from the following physical data bases:
Purchase Order data base
Commodity data base
Maintenance Inventory data base The purpose of the Buyer data base is to provide an editing function, such as: is this a valid buyer code, what purchase orders belong to this buyer, what commodities has this buyer purchased, and how many and when?

This data base has information relating to the buyer's job function and type of work performed.

No expense information is maintained in this data base.

MEL0014, VENDOR DATA BASE—The logical Vendor data base is comprised of segments from the following physical data bases:
Purchase Order data base
Maintenance Inventory data base
Commodity data base This data base's primary functions are to answer the following:
(1) Who are our vendors?

(2) What purchase orders are these vendors related to?

(3) What commodities do these vendors relate to?

Another primary function is to track the vendor's quotes, their contracts and late or pending quantity information. This data base is also used for editing and verification purposes.

MEL0015, INVENTORY INDEX DATA BASE—The logical Inventory Index Data base is comprised of segments from the physical Maintenance Inventory data base. This data is the index or list of the Maintenance Inventory data base.

MEL0016, SUB-ASSEMBLY DATA BASE—The logical Sub-Assembly data base is comprised of segments from the following physical data bases:
Manufacturer Table data base
Maintenance Inventory data base The primary function of the Sub-Assembly data base is to help keep track of the inventory parts, and parts definition, for inventory items repaired internally for use in the repair of specific pieces of equipment, i.e., pumps, speed reducers, etc.

As will become clear, each data base record consists of a hierarchical relation of segments. This structure can be appreciated by reference to FIGS. 4–19 in which schematic representations are illustrated for the various individual data bases. For example, in FIG. 7 there is shown in schematic form a grouping of hierarchically structured segments constituting the MR data base; the uppermost, or parent segment in such tree structure being designated 100. At the second level or next level downward from this parent or root segment there are shown a plurality of segments 102, all of which are connected to the root segment 100. The individual segments are sometimes referred to as nodes and the connections as "branches" in a tree structure definition. Below the leftmost segment 102 there is a segment 104 at the next subordinate level, or third level, whereas further subordinate segments 106 and 108 at this third level are shown connected by branches 111 and 113 respectively to segments or nodes at the second level.

All this is graphically indicated by the aforenoted logical pointers or pointer segments indicated by the branches or lines with arrows at either end radiating from the physical MR data base. This can be understood in detail from the schematic of FIG. 7 in which the pointer segments 110, 112, 114, 116, 118 and 120 are depicted. What this simply means is that the data is not stored at or in these particular segments but is pointed or referenced to the indicated physical data base. Thus, taking the segment 110 as an example, this is a cost center expense pointer (which bears at the arrow portion the code name CCPO root) and the data is thus physically located in the cost center data base (at the root segment thereof). Similarly, for the other subordinate segments which are likewise referred to the root segments of the appropriately marked physical data bases.

Figure 10:
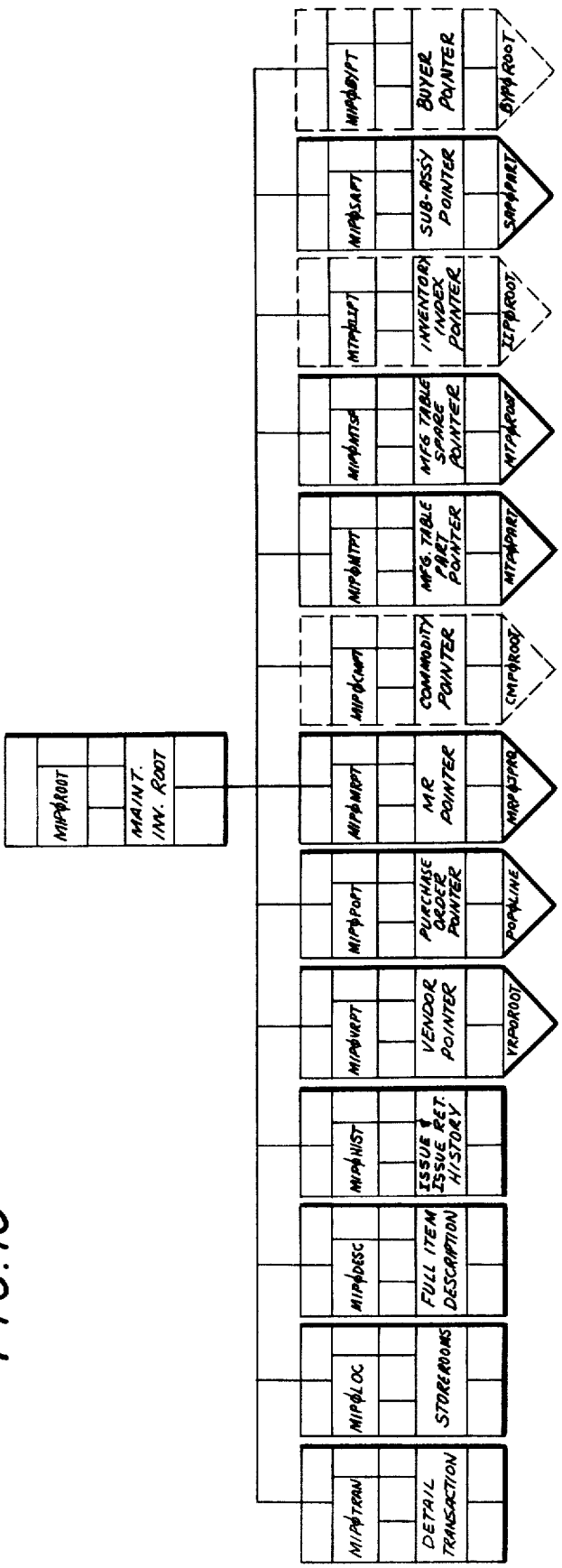
Figure 11:
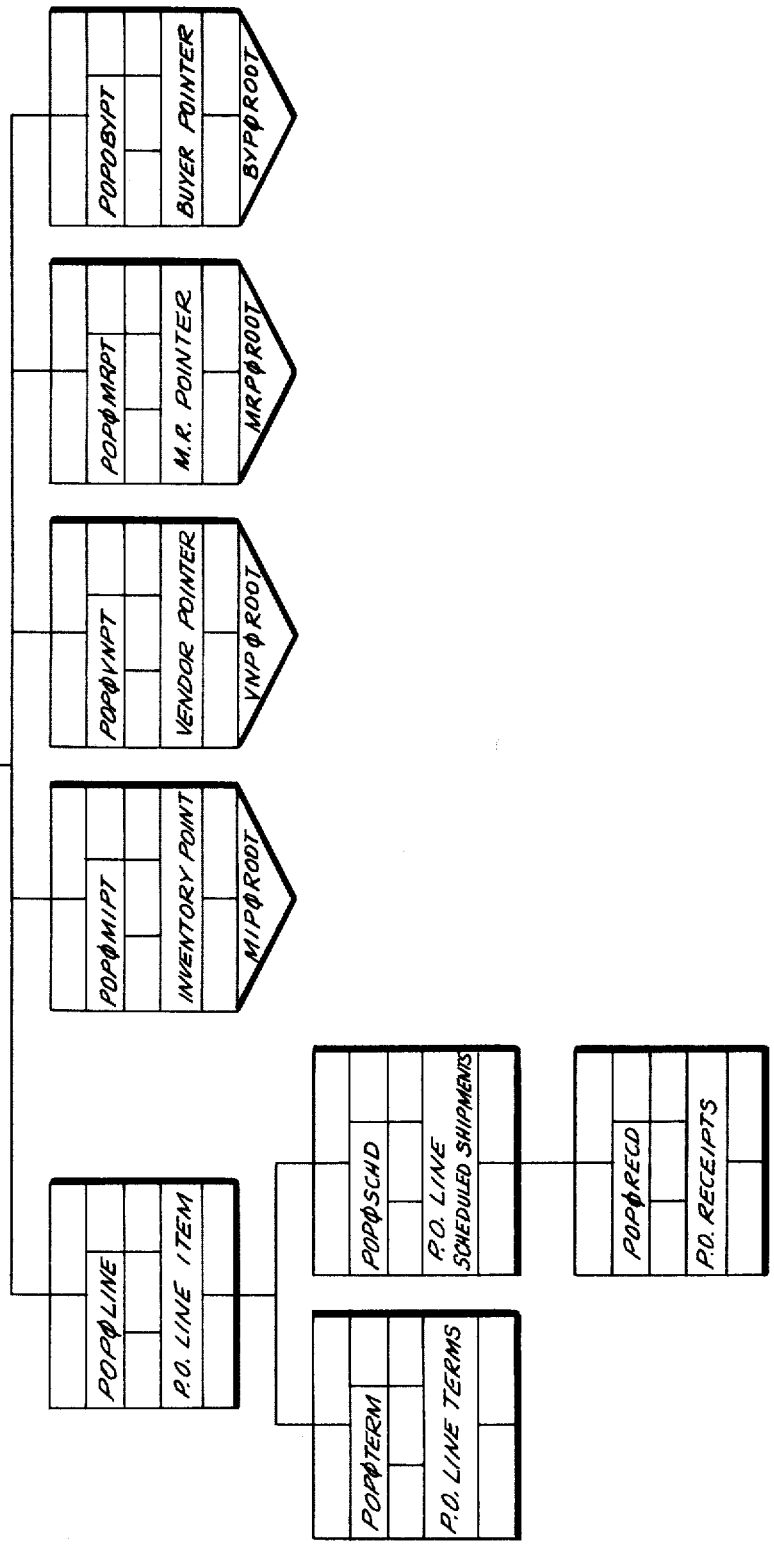
Figure 12:
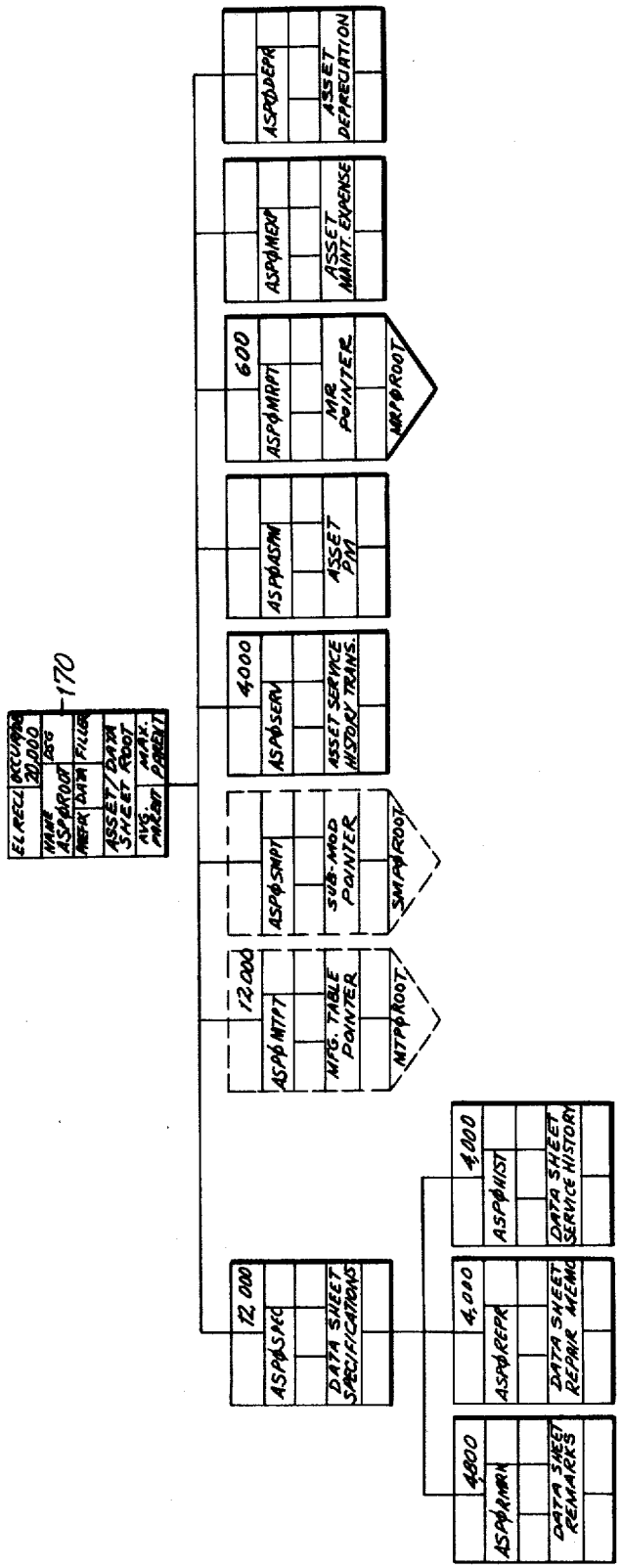
Figure 14:
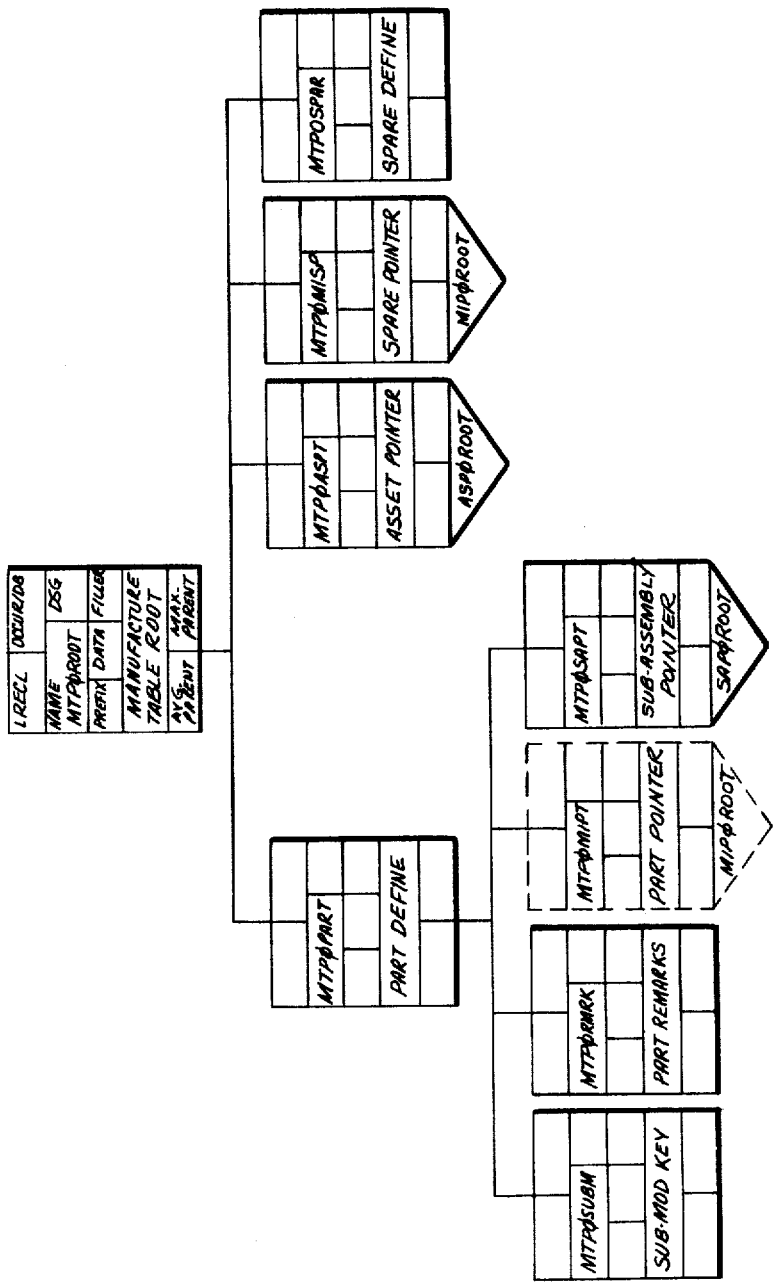
Figure 15:
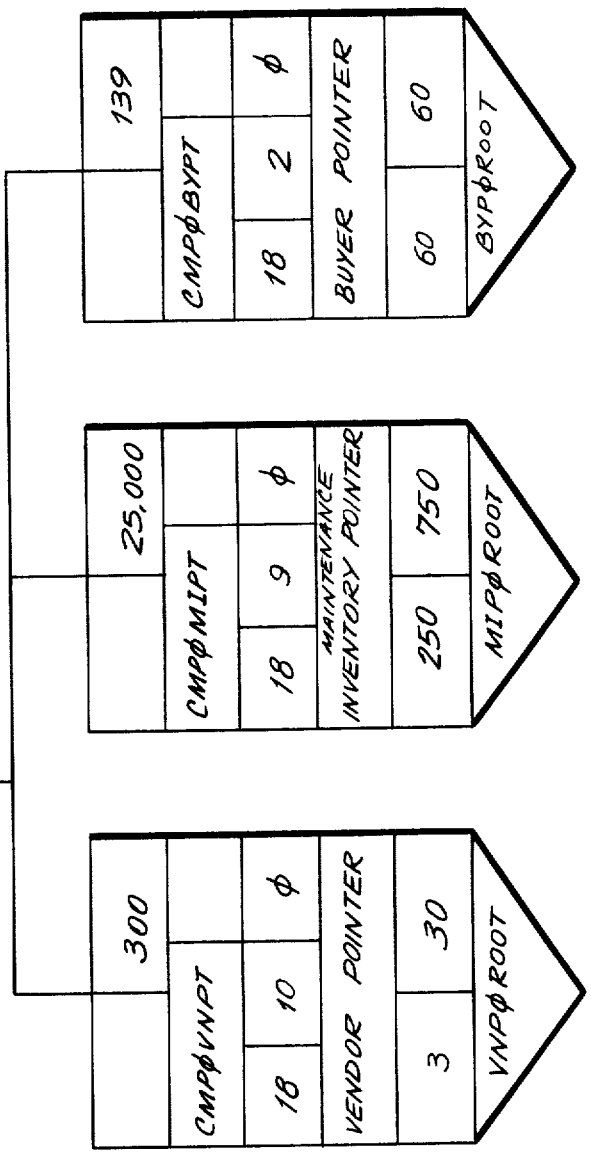
Figure 16:
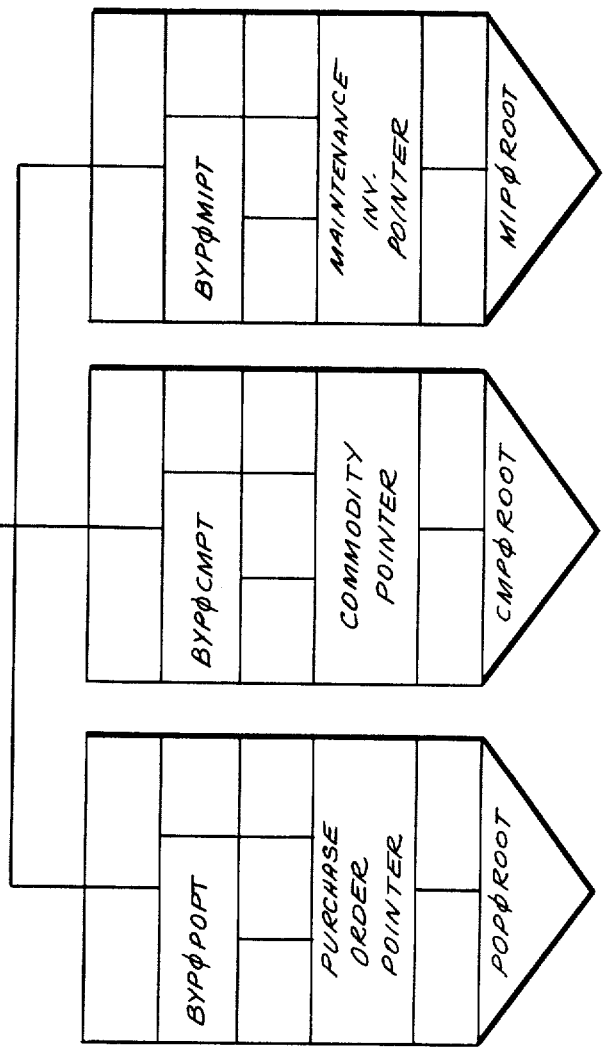
Figure 19:
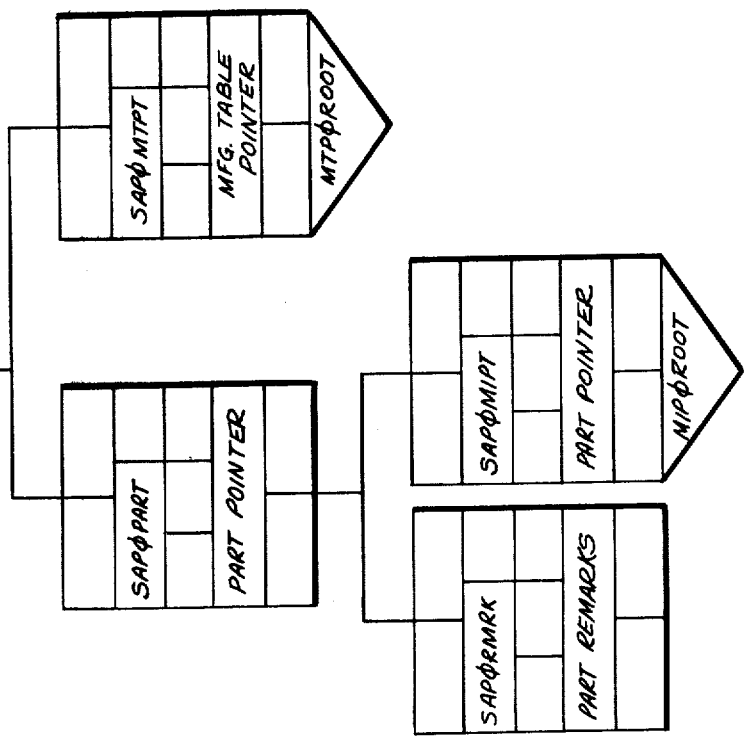

With respect to the particular pointer segments 110 and 120, these both relate to the cost center, that is, they are both referred to the root segment in the cost center physical data base but this root segment is branched to subordinate segment 108 at the third level; the data stored thereat is the job package requirements as to inventory accumulation and depletion, and this segment is referred to the inventory root segment in the maintenance inventory physical data base seen in FIG. 10.

Figure 7:
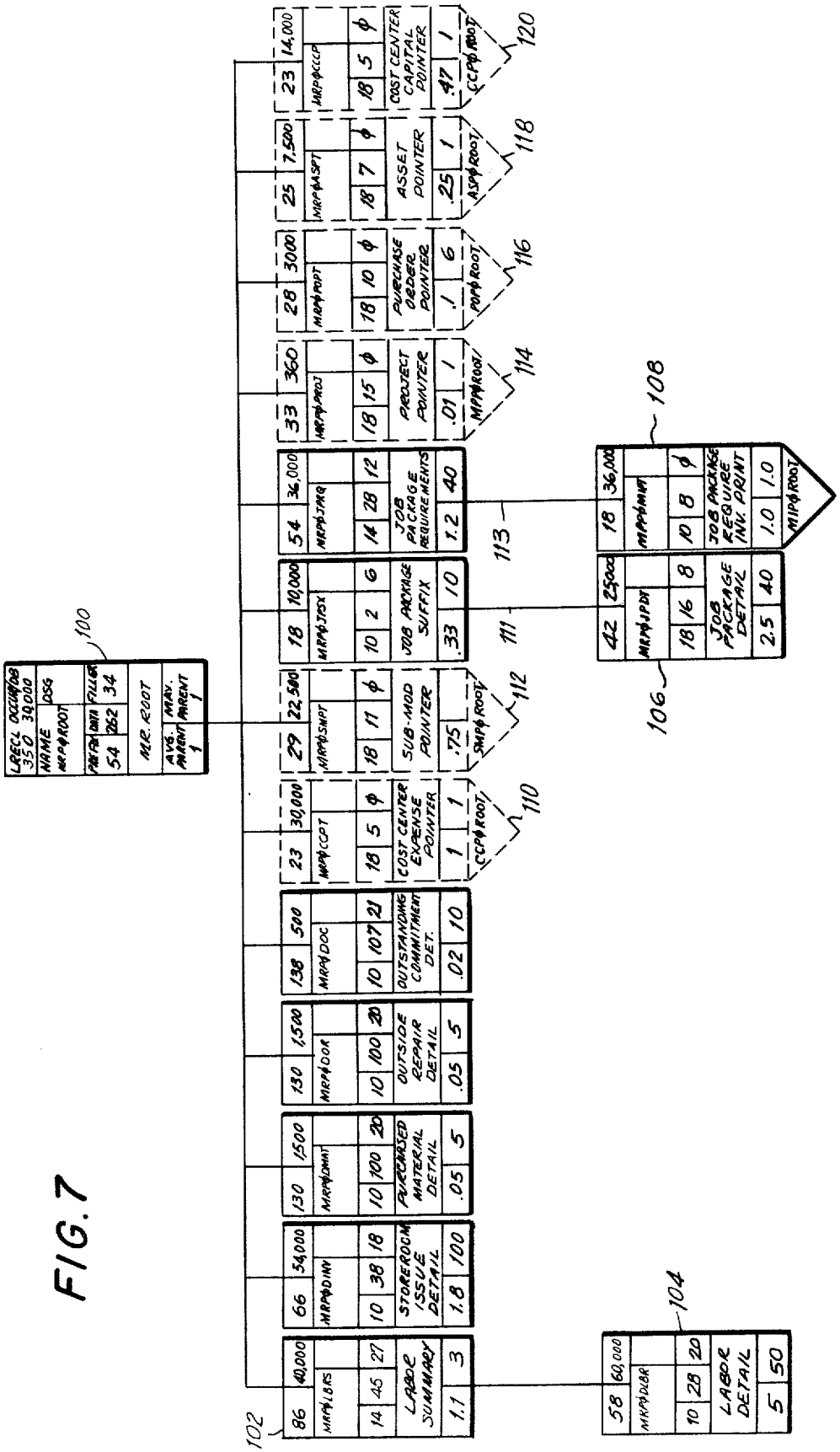

The two primary functions of the MR data base illustrated in FIG. 7 are, as already noted, to accumulate, both in summary total and by detailed transaction, all expenditures by the maintenance department required to complete a job. For example, the labor summary data is located at the leftmost segment 102 at the second level in FIG. 7, whereas the detail of the labor required for a particular job is contained in segment 104 at the third level. On the other hand, details as to storeroom issue purchase material and the like, as seen in the segments to the right of the labor summary segment, are at the second level in the data base configuration.

It should also be mentioned that a secondary function of the MR data base in FIG. 7 is to maintain the expense data and status information for historical reference; moreover, this data base serves as the editing standard for all the maintenance request related data throughout the maintenance expense control system.

Figure 8:
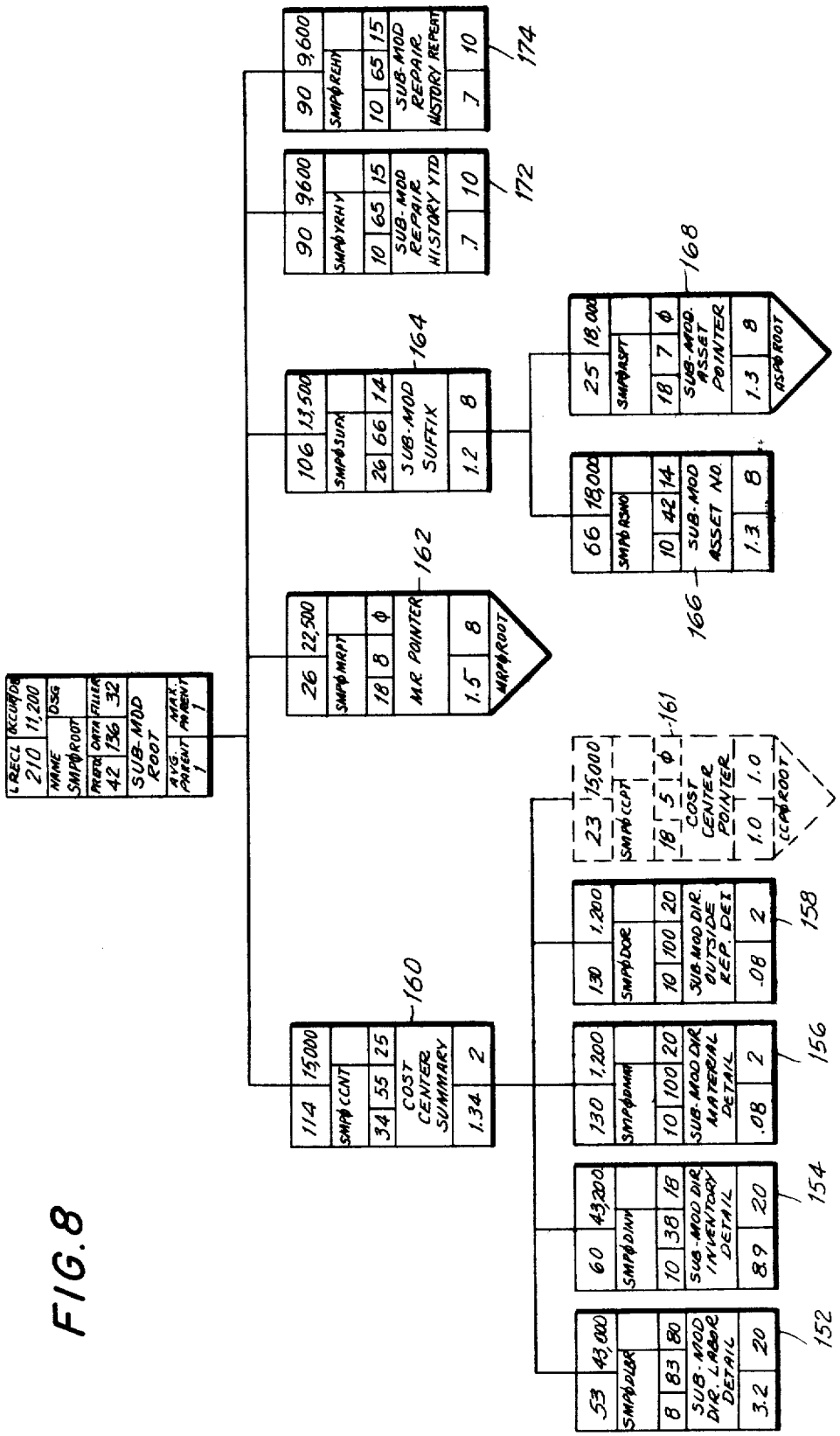

Referring now to FIG. 8, there is seen the so-called SUBMOD data base having hierarchically related segments as illustrated. The concept and arrangement of this particular data base is a unique aspect of the control system of the present invention. By this concept a single data base has the capability of handling multiple types of records. There are two basic types of records in this SUBMOD data base, namely, service numbers and non-specific SUBMODS. A service number is assigned to one or more pieces of mechanical equipment (assets) that perform a function. A typical service number assigned herein would be to the combination, for example, of a motor and pump. It should be noted that electric motors are included as an exception within the definition of mechanical equipment. Other planned SUBMOD types are piping, electrical loops and instrument loops.

In accordance with this feature of providing a SUBMOD data base, there is the attendant capability of providing maintenance costs and repair history of the noted functional groups of equipment, as well as being able to gain the requisite information, for example, asset number.

Since the SUBMOD data base shown in FIG. 8 is interrelated with the other data bases, as depicted in FIG. 3, it will be apparent that this arrangement provides a further capability of storing data in one place and retrieving it from related entry points. A maintenance request was defined, as seen from FIG. 3, as logically related to a project, cost center, SUBMOD and asset data base, whereas the logical SUBMOD data base is composed of segments contained in the maintenance request, cost center, and asset data bases, in addition to those physically located as seen in FIG. 8.

As previously indicated in general terms, the SUBMOD data base serves two primary functions, the first of which is to accumulate maintenance expenses, as aforenoted, to a functional group of equipment and to accomplish this the SUBMOD data base accumulates expense data from two sources: direct to SUBMOD and direct to maintenance request. Expense totals for "direct" SUBMOD charges are substantiated by detailed transactions maintained in the SUBMOD data base in the subordinate segments (that is, the segments at the second level below the root segment, i.e., in the segments designated 152, 154, 156 and 158). These are subordinated to a segment at the upper or second level indicated as Cost Center Summary and designated by numeral 160. This node or segment 160 contains general information about the name and number of a given cost center with reference to a particular record of a SUBMOD, or functional piece of equipment, such as a pump and motor combination. In other words, the cost center charged with the cost of the particular functional unit is contained in this cost center summary segment 160. This segment is also tied to segment 161 (subordinate to 160), which constitutes a pointer segment which is tied to the detailed data contained in the cost center data base.

The arrangement for obtaining the aforenoted expense totals for direct maintenance request charges is accomplished by reason of the established pointer relationship, i.e., because of the pointer segment 161 tied to the maintenance request data base.

The second primary function of the SUBMOD data base is to define the functional group of equipment in terms of the fixed assets which make up that group. A secondary function of the SUBMOD data base is to maintain, through non-expense transactions, a history of problems and repairs to the fixed assets in a SUBMOD. The relationship of the functional grouping to the particular assets are defined by way of the segments 164 at the second level, and the subordinate segments 166 and 168 at the third level, in the hierarchy of FIG. 8. The segment 166 contains the individual assets or asset numbers of particular SUBMODS and the pointer segment 168 is tied to the asset data base of FIG. 12; specifically, to the root segment 170 seen therein. The history details are contained in the segments 172 and 174 seen at the far right at the second level in FIG. 8.

Figure 9:
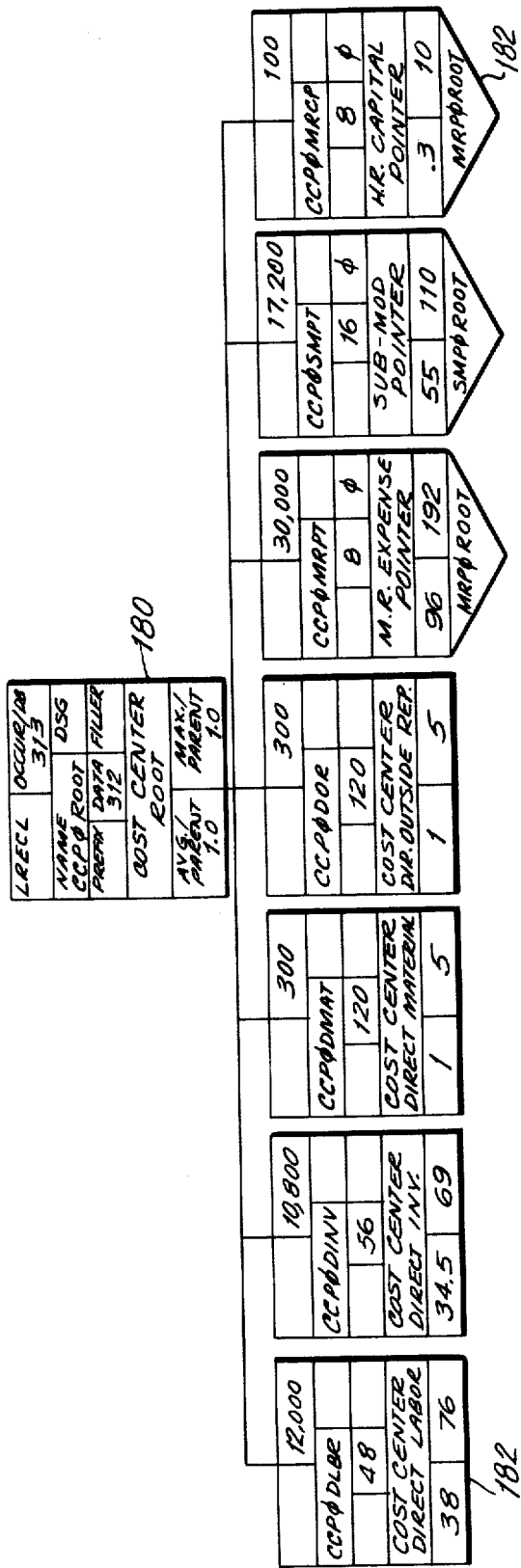

Referring now to FIG. 9, there will be seen the hierarchical structure within the cost center data base. At the first or "upper" level is the root segment 180, and at the next, or second level, a series or group of subordinate segments all designated 182. The four subordinate segments on the left are physically present within this data base, whereas the three pointer segments on the right are tied to root segments in other data bases. Thus, the SUBMOD pointer indicates a tie to the SUBMOD root segment 159 (FIG. 8), whereas the other two are tied through the maintenance request root segment to the subordinate expense segment 116 and capital segment 120 respectively (FIG. 7).

It will be understood that the primary function of the cost center data base seen in FIG. 9 is to accumulate all maintenance expenses to a particular function within the plant, for example, to a function such as task handling or insecticide direct labor, or operational start-up of agricultural division. In order to accomplish this, the cost center data base accumulates and maintains expense summary totals from three sources: direct to cost center, direct to SUBMOD, direct to maintenance request. Each of these expense summary totals is substantiated by detailed transactions maintained in their aforesaid respective data bases. The cost center data base also accumulates capital expenditures through charges made to capital maintenance requests.

FIG. 6 illustrates the maintenance project data base or MP, and this particular data base is comprised of segments from the maintenance project physical data base, and also from the maintenance request data base, by reason of the pointer segment 192.

The primary function of this maintenance project data base is to maintain, in summary, the total expenditures of the maintenance department to a capital project. The only way in which charges can be accumulated to a project is through a maintenance request. All summary totals in the maintenance project data base of FIG. 6 are substantiated by the detailed transactions maintained in the maintenance request data base of FIG. 7. The maintenance project data base also serves as the editing standard for project-related data throughout the maintenance expense control system of the present invention.

FIGS. 4 and 5 illustrate respectively the table data base and foreman data base. Each of these is limited to a root segment, the table root segment being designated 194 in FIG. 4 and the foreman root segment 196 in FIG. 5.

Considering the maintenance request data base of FIG. 7 as exemplary of all the individual data bases shown schematically in the several figures, that is, FIGS. 4–19, it will be understood that a data base record in this context is constituted of a root segment plus all of its children, or subordinate segments. Thus the root segment 100 contains a variety of fields including the "key" such as the number of the maintenance request, a description of the maintenance request such as "replace valve", the date the request was opened, etc. A particular occurrence of the subordinate segment, such as labor summary, would contain data with respect to the particular maintenance request number, that is, to a precise maintenance "occurrence" and this labor summary segment 102 would contain data as to the actual amount in dollars charged to that particular maintenance request. A subordinate segment 104, that is, subordinate to the labor summary segment 102, contains details as to the labor such as the group involved, the foreman and the number of hours worked, etc.

This same or similar hierarchical structure for the other data bases is established or accomplished as will be readily apparent from the other individual schematic diagrams of FIGS. 4–6 and 8–19.

In order to give a sense of the integration of data resulting from the principles of the present invention, an illustration is provided in FIG. 20 of the complete data base complex in which a plurality of "stacked" records in three-dimensional form are shown, as contrasted with the two-dimensional generalized data base record presentation in the individual data base schematic diagrams of FIGS. 4–19.

This diagram of the maintenance control system in FIG. 20 provides a visual representation of organizational relationships, and the corresponding data interactions involved in monitoring and controlling a maintenance operation.

Superimposed over the diagram is a sequentially numbered example of how data interracts throughout the system in providing technical maintenance information and maintenance cost reporting.

OPERATION

Having disclosed the fundamental principles of the hierarchically structured data base complex of the overall system in accordance with the present invention, it is well to consider the operating environment, particularly the constituent elements involved in the processing of data in such data base system. As already noted in the introduction, the basic operation involves either an interactive user or batch user, or his respective application programs, interfacing with a specially designed data base processing system, including a host computer or the like, so as to interact with the interrelated complex of data bases constituting the primary feature of the present invention.

As has been noted by referring to FIG. 5 of the work by Kroenke entitled, "Database", in the case of a batch user, there is a direct connection with the data base processing system, whereas when the use is interactive or remote, that is to say, a user or his application programming is interfacing from a CRT terminal or the like, a data communications processor is provided in the link to the data base processing system.

In any event, the user, particularly as indicated or explained by reference to the schematic diagrams (FIGS. 4-20) illustrating the hierarchical arrangements, specifies by this means the formats of the data and the relationships among data items. The data base complex is "loaded" by filling with data the illustrated schematic arrangements; that is, the hierarchical structures of each of the data bases of FIGS. 4-20.

In general terms, the user accesses data by requesting the system to retrieve portions of the data base and such accesses can be direct and simple or indirect and complex, as will be explained hereinafter. Two basic steps are, of course, involved in accessing data, that is, the required data must first be found, and then be presented to the user so as to be in a desirable format.

In addition to accessing the particular data involved in the present system, that is, retrieving from segments having data summaries or to those containing particular details, the data base complex is also constantly being maintained by modifying or "updating" it. Thus, data is continuously being added, deleted or changed. Furthermore, there may be a requirement that a new relationship be established between data items that are already defined or even a new type of data may have to be added.

Before proceeding with a description of representative programming involved in maintaining and accessing the data base complex 60, it should be noted that generally speaking the DL/I model manipulates data on a segment basis, specific commands being available to retrieve or to "update", i.e., to add, delete, or change the segment data in some way.

It is known to those skilled in the art and particularly to those skilled in IMS that the hierarchical data is represented therein by one of four organizations known as HSAM, HISAM, HDAM and HIDAM. The first two are sequential representations while HDAM and HIDAM are direct. The maintenance expense control system of the present invention, as specifically embodied in its present form, utilizes HIDAM (hierarchical indexed direct access method), which allows roots to be processed by an index and subordinate segments to be processed directly using pointers. Since the principles and detailed implementation of HIDAM are well known and do not per se constitute a feature of the inventive concept of the present invention, it is considered sufficient for an appreciation and understanding of the present invention to refer simply to the aforenoted work by Kroenke, particularly page 228 thereof. Nevertheless, an exemplary group of steps or operations utilizing HIDAM, performed as a result of a specific program, will be described hereinafter.

In order to provide the man skilled in the art with some notion of the programming involved in connection with the formulation or implementation of the concepts of the present invention, reference may be made to the following list of representative programs and more particularly to those involved in interactive processing, that is, those which include a data communications component or "block", as has already been brought out. Such interactive processing contrasts with the more conventional batch processing.

Document #3

Document #3 (Continued)

| PROGRAM | CODE | TEST | PROD | SCREENS | PRTY | TYPE | TRANS | DESCRIPTION | TRANSACT | MIDNAME | FORMAT | MODNAME |
|---|---|---|---|---|---|---|---|---|---|---|---|---|
| ME1A059 | x | x | x | | 1 | 8 | UPD | MR LGRP CHANGE | META055 | ME1A059 | MED020 | MEOMLCHG |
| ME1A060 | x | x | x | | 1 | 8 | UPD | SM SUFX CHANGE | META060 | ME1A060 | MED020 | MEOSSCHG |
| ME1A061 | x | x | x | | 1 | 8 | UPD | SM SUFX DELETE | META061 | ME1A061 | MED021 | MEOSSDLT |
| ME1A062 | x | x | x | | 1 | 8 | UPD | SM ASNO ADDITION | META062 | ME1A062 | MED025 | MEOSAADD |
| ME1A063 | x | x | x | | 1 | 8 | UPD | SM ASNO CHANGE | META063 | ME1A063 | MED025 | MEOSACHG |
| ME1A064 | x | x | * | | 1 | 8 | UPD | SM ASNC DELETE | META064 | ME1A064 | MED025 | MEOSADLT |
| ME1A065 | x | x | x | | 1 | 8 | UPD | MAINT LABOR EDIT | META065 | ME1A065 | MED027 | MEOEDITL |
| ME1A066 | x | x | x | | 1 | 8 | UPD | MR LGRP DELETE | META066 | ME1A066 | MED020 | MEOMLDLT |
| ME1A067 | x | x | x | | 1 | 8 | UPD | MR CAPITALIZATION | META067 | ME1A067 | MED028 | MEOMCAP |
| ME1A068 | x | x | x | | 1 | 8 | UPD | AS ADDITION - MAINT | META068 | ME1A068 | MED020 | MEOAADD |
| ME1A069 | x | x | x | | 1 | 8 | UPD | AS ADDITION - PLANT | META069 | ME1A069 | MED038 | MEOAADDJ |
| ME1A070 | x | x | x | | 1 | 8 | UPD | AS CHANGE - MAINT | META070 | ME1A070 | MED037 | MEOACHG |
| ME1A071 | | | | | | 8 | UPD | AS CHANGE - ACCTG | META071 | ME1A071 | MED038 | MEOACHGA |
| ME1A072 | x | x | x | | 1 | 8 | UPD | AS SPEC ADDITION | META072 | ME1A072 | MED033 | MEOASADD |
| ME1A073 | x | x | x | | 1 | 8 | UPD | AS SPEC CHANGE | META073 | ME1A073 | MED039 | MEOASCHG |
| ME1A074 | x | x | x | | 1 | 7 | UPD | AS RMRK ADDITION | META074 | ME1A074 | MED040 | MEOARMAD |
| ME1A075 | x | x | x | | 1 | 7 | UPD | AS RMRK CHANGE | META075 | ME1A075 | MED040 | MEOARMCH |
| ME1A076 | x | x | x | | 1 | 7 | UPD | AS RMRK DELETE | META076 | ME1A076 | MED040 | MEOARMDL |
| ME1A077 | x | x | x | | 1 | 7 | UPD | AS REPR ADDITION | META077 | ME1A077 | MED041 | MEOARPAD |
| ME1A078 | x | x | x | | 1 | 7 | UPD | AS REPR CHANGE | META078 | ME1A078 | MED041 | MEOARPCH |
| ME1A079 | x | x | x | | 1 | 7 | UPD | AS REPR DELETE | META079 | ME1A079 | MED041 | MEOARPDL |
| ME1A080 | x | x | x | | 1 | 7 | UPD | AS HISTORY ADDITION | META080 | ME1A080 | MED042 | MEOAHADD |
| ME1A081 | x | x | x | | 1 | 7 | UPD | AS HISTORY CHANGE | META081 | ME1A081 | MED042 | MEOAHCHG |
| ME1A082 | x | x | x | | 1 | 7 | UPD | AS HISTORY DELETE | META082 | ME1A082 | MED042 | MEOAHDLT |
| ME1A083 | | | | | 1 | 8 | UPD | GAS TICKET UPDATE | META083 | ME1A083 | MED043 | MEOGAS |
| ME1A084 | x | x | x | | 1 | 4 | INQ | AS STATUS | META084 | ME1A084 | MED044 | MEOASTAT |
| ME1A085 | x | x | x | | 1 | 4 | INQ | AS SPECIFICATIONS | META085 | ME1A085 | MED045 | MEOASPEC |
| ME1A086 | x | x | x | 25 | 1 | 4 | INQ | AS PARTS LIST | META086 | ME1A086 | MED046 | MEOAPART |
| ME1A087 | x | x | x | 25 | 1 | 3 | INQ | AS SERVICE HISTORY | META087 | ME1A087 | MED047 | MEOASERV |
| ME1A088 | x | x | x | 25 | 1 | 3 | INQ | AS REPAIR HISTORY | META088 | ME1A088 | MED048 | MEOAREPR |
| ME1A089 | | | | | 1 | 3 | INQ | AS PM DATA | META089 | ME1A089 | MED049 | MEOAPM |
| ME1A090 | | | | 25 | 1 | 3 | INQ | AS SPARE EQUIPMENT | META090 | ME1A090 | MED050 | MEOASPAR |
| ME1A091 | x | x | x | | 1 | 7 | UPD | MT ADDITION | META091 | ME1A091 | MED029 | MEOEADD |
| ME1A092 | x | x | x | | 1 | 7 | UPD | MT CHANGE | META092 | ME1A092 | MED029 | MEOECHG |
| ME1A093 | x | x | x | | 1 | 7 | UPD | MT PART ADDITION | META093 | ME1A093 | MED030 | MEOEPADD |
| ME1A094 | x | x | x | | 1 | 7 | UPD | MT PART CHANGE | META094 | ME1A094 | MED030 | MEOEPCHG |
| ME1A095 | x | x | x | | 1 | 7 | UPD | MT PART DELETE | META095 | ME1A095 | MED030 | MEOEPCLT |
| ME1A096 | x | x | x | | 1 | 7 | UPD | MT SUBMCD ADDITION | META096 | ME1A096 | MED031 | MEOESMAD |
| ME1A097 | x | x | x | | 1 | 7 | UPD | MT SUBMCD DELETE | META097 | ME1A097 | MED031 | MEOESMDL |
| ME1A098 | x | x | x | | 1 | 7 | UPD | MT REMARK ADDITION | META098 | ME1A098 | MED032 | MEOERADD |
| ME1A099 | | | | | 1 | 7 | UPD | MT REMARK CHANGE | META099 | ME1A099 | MED032 | MEOERCHG |
| ME1A100 | x | x | x | | 1 | 7 | UPD | MT REMARK DELETE | META100 | ME1A100 | MED032 | MEOERDLT |
| ME1A101 | x | x | * | | 1 | 7 | UPD | MT SPARE ADDITION | META101 | ME1A101 | MED033 | MEOESPAD |
| ME1A102 | x | x | x | | 1 | 7 | UPD | MT SPARE CHANGE | META102 | ME1A102 | MED033 | MEOESPCH |
| ME1A103 | x | x | * | | 1 | 7 | UPD | MT SPARE DELETE | META103 | ME1A103 | MED033 | MEOESPDL |
| ME1A104 | x | x | x | 25 | 1 | 3 | INQ | MT ASSETS | META104 | ME1A104 | MED034 | MEOEASST |
| ME1A105 | x | x | x | 50 | 1 | 3 | INQ | MT PARTS LIST | META105 | ME1A105 | MED035 | MEOEPART |
| ME1A106 | x | x | x | 50 | 1 | 3 | INQ | MT SUBMCDS | META106 | ME1A106 | MED036 | MEOESUBM |
| ME1A107 | x | x | x | | 1 | 7 | UPD | MR MAINT TYPE CHANGE | META107 | ME1A107 | MED051 | MEORTYPE |
| ME1A108 | x | x | x | | 1 | 7 | UPD | MR FMAN STAT/DATE | META108 | ME1A108 | MED052 | MEOMFCHG |
| ME1A109 | x | x | x | | 1 | 7 | UPD | MT PART - REMKS DUP | META109 | ME1A109 | MED053 | MEOEPDUP |
| ME1A110 | x | x | x | | 1 | 7 | UPD | MT PART - REMKS DUP | META110 | ME1A110 | MED054 | MEOEPDUX |
| ME1A111 | x | x | x | | 1 | 7 | UPD | LD ROOT ADD | META111 | ME1A111 | MED055 | MEOLADD |
| ME1A112 | x | x | x | | 1 | 7 | UPD | LD ROOT CHANGE | META112 | ME1A112 | MED056 | MEOLCHG |
| ME1A113 | x | x | x | | 1 | 7 | UPD | LD ROOT DELETE | META113 | ME1A113 | MED057 | MEOLDLET |
| ME1A114 | x | x | x | | 1 | 7 | UPD | LD LABOR DISTRIBUTIO | META114 | ME1A114 | MED058 | MEOLABOR |
| ME1A115 | x | x | x | | 1 | 7 | INQ | LD STATUS/DISPLAY | META115 | ME1A115 | MED059 | MEOLINFO |
| ME1A116 | x | x | x | | 1 | 7 | UPD | LD LABOR CHANGE ALL | META116 | ME1A116 | MED060 | MEOLCHGE |
| ME1A117 | x | x | x | | 1 | 7 | UPD | LD LABOR CHANGE 1 | META117 | ME1A117 | MED061 | MEOLCHG1 |
| ME1A118 | x | x | x | | 1 | 7 | UPD | LD LABOR DATE CHANGE | META118 | ME1A118 | MED062 | MEOLDATE |
| ME1A119 | | | | | 1 | 3 | INQ | LD DISPLAY ABSENCE | META119 | ME1A119 | MED063 | MEOLABSE |
| ME1A120 | | | | | 1 | 3 | INQ | LD LABOR BY FOREMAN | META120 | ME1A120 | MED064 | MEOLFORE |
| ME1A121 | | | | | 1 | 7 | UPD | ?? OPTION-01 | META121 | ME1A121 | MED065 | ???????? |
| ME1A122 | x | x | x | | 1 | 7 | UPD | TB MAINT BUD ADJ | META122 | ME1A122 | MED067 | MEOTADDM |
| ME1A123 | | | | | 1 | 7 | UPD | TB MAINT BUD CHG | META123 | ME1A123 | MED067 | MEOTCHGM |
| ME1A124 | x | x | x | | 1 | 7 | UPD | TB MAINT BUD DLET | META124 | ME1A124 | MED067 | MEOTDLEM |
| ME1A125 | x | x | x | | 1 | 7 | UPD | | META125 | ME1A125 | MED068 | |
| ME1A126 | | | | | 1 | 8 | UPD | AS TRANSFER - ACCTG | META126 | ME1A126 | MED069 | MEOATRA |
| ME1A127 | | | | | 1 | 8 | UPD | AS REPAIR - MAINT | META127 | ME1A127 | MED070 | MEOATRM1 |
| ME1A128 | | | | | 1 | 8 | UPD | AS TRANSFER - MAINT | META128 | ME1A128 | MED071 | MEOATRM2 |
| ME1A129 | | | | | 1 | 8 | UPD | AS ADDITION ACCTG C | META129 | ME1A129 | MED072 | MEOAADDC |
| ME1A130 | | | | | 1 | 8 | UPD | AS SALES | META130 | ME1A130 | MED073 | MEOASCP |
| ME1A131 | | | | | 1 | 8 | UPD | AS PARTIAL SCRAP | META131 | ME1A131 | MED074 | MEOAPSCP |
| ME1A132 | | | | | 1 | 8 | UPD | AS CAPITILIZATION | META132 | ME1A132 | MED075 | MEOACAP |
| ME1A133 | | | | | 1 | 8 | UPD | AS COMMENTS | META133 | ME1A133 | MED076 | MEOACCMS |
| ME1A134 | | | | | 1 | 8 | UPD | AS DETAIL HISTORY | META134 | ME1A134 | MED077 | MEOADET |
| ME1A135 | | | | | | | UPD | | META135 | | | |
| ME1A136 | x | x | | | 1 | 7 | UPD | PR PROJCODE ADD | META136 | ME1A136 | MED600 | MEOPRADD |
| ME1A137 | x | x | | | 1 | 7 | UPD | PR PROJCODE CHG | META137 | ME1A137 | MED601 | MEOPRCHG |
| ME1A138 | x | x | | | 1 | 7 | INQ | PR PROJECT LIST | META138 | ME1A138 | MED602 | MEOPRLST |

It will be particularly noted that a representative group of 76 programs are listed, such being available for the two basic purposes already outlined: for the purpose of inquiring, that is, accessing data, and for the purpose of updating. The particular type of program is shown in the "TYPE" column as INQ or UPD.

A description is given for each program as shown under that heading and, for example, the ME1A000 program is an inquiry directed to maintenance request status; that is, the inquiry is concerned with determining the status of a particular MR. The columns designated "TRANSACT", "MIDNAME", "FORMAT", and "MODNAME" refer simply to the following respectively:

TRANSACT—Transaction identification code. A unique name identifying or connecting a specific program or module with a specific screen used for displaying the information.

MIDNAME—Midname is the name given to the input device or screen layout. The midname is the layout the program receives when the module is activated. It contains the fields the user enters to be edited by the module/program to determine what information is to be retrieved from the particular data base.

MODNAME—The modname is the layout the program sends back to the user and it contains the information retrieved by the module and placed in a predetermined format so the information is meaningful.

FORMAT—The format is the layout the screen or CRT uses to display the information the module retrieved from the data base. It contains the heading information describing the various data fields, such as MR number, description of the MR number, dates as related to the MR and other information contained in the segment or segments for a particular MR number.

A further document, that is, Document 4, is provided below:

Document # 4

```
 01/15/80          MAINTENANCE REQUEST STATUS                    META000

(1) M R NO.  223425  (2) TITLE:  RPL P-1 VACUUM PUMP FOR F-1  (3) CONTROL NO.  030083
   (4)             (5)                          (6)                  (7)
 COST CNTR  V3140  PROJECT  7900-3140         SUBMOD  A4030337    ASSET  611330C
   (8)         (9)         (10)            (11)
 PRIORITY  92  ANALYST  29  MAINT TYPE  62  AREA CODE
   (12)            (13)                (14)                  (15)
 STATUS  CLOSED   DATE WRTN  05-16-79   DATE REQD  08-30-79   DATE OPEN  05-16-79
                 (16) DATE COMP  10-17-79   DATE CLSD  11 23-79
                        (19)             (20)           (21)           (22)
             (18)      ACTUAL          PLANNED         ACTUAL         PLANNED
            NUMBER     AMOUNT          AMOUNT          HOURS          HOURS

LABOR         30     2,962.97        2,455.71         191 00         158.30
 INVENTORY     87     1,660.75        1,502.00
 MATERIAL      13     2,095.78        2,000.00
 C/S REPAIR     2     1,369.83          600.00

TOTAL                8,087.63        6,555.71

C/S COMMIT (23)
 DEPRESS PF 1 TO RETURN TO THE MENU
```

This document illustrates a screen layout which is available in response to the aforenoted inquiries in accordance with DC PROGRAM ME1A000.

This particular maintenance request status refers to MR 223425 whose subject matter is RPL P-1 VACCUM PUMP FOR F-1.

The detailed operational steps performed in accordance with this particular program ME1A000 are shown in FIG. 21, in which the MODNAME MEOSTAT is indicated. It will be appreciated that the appropriate segments in the maintenance request data base of FIG. 7 are searched, and that the actual amounts shown in Document 4 are those contained in the specific record occurences therein that have been "read out".

The various categories of information, designated by the numerals in parenthesis, appearing in the screen format reproduced in Document 4 are as follows:

(1) MR NUMBER—Maintenance Request number inquired.

(2) TITLE—Description of maintenance work performed on this MR.

(3) CONTROL NUMBER—Preprinted number on each MR document. Used for document control.

(4) COST CENTER—Cost center toward which MR charges will be made. Expense charges will appear against this cost center only. Project charges on major maintenance projects related to this cost center will be for cost control information only.

(5) CAPITAL PROJECT NUMBER—Maintenance charges on MR inquired will appear against this project only. If no project number is specified, charges are expense.

(6) SUBMOD NUMBER (EQUIPMENT GROUPING)—Maintenance charges made on this MR will be associated with this SUBMOD number.

(7) FIXED ASSET NUMBER—This is the fixed asset number of the specific piece of equipment worked on, located in the SUBMOD (equipment grouping) specified.

(8) PRIORITY—Priority is the degree of urgency needed for the maintenance work as determined by the originator of the MR.

(9) ANALYST CODE—This is the code number of the planner responsive for information provided on this MR. See the analyst code table screens for a listing of all analyst codes.

(10) MAINTENANCE TYPE—This number represents the nature of the work performed on the inquired MR. See the maintenance type table screen for a listing of all maintenance type numbers. (This number is also used to classify the MR as capital or expense, see table.)

(11) AREA CODE—This is the production area for which the work requested is performed. A number will appear on general fund projects only for which no cost center is entered. For expense MR's, the cost center specified will determine the area code.

(12) STATUS CODE—This is the active status of the MR. The codes specified will be the following: P—pending, planning in progress; O—open, MR active; C—complete, MR work finished; X—closed, MR administratively closed.

(13) DATE WRITTEN—Date the MR was written by the originator of the work request.

(14) DATE REQUIRED—The date the work requested on the MR is to be completed.

(15) DATE OPENED—The date the MR was entered into the maintenance information system.

(16) DATE COMPLETE—The date the MR was changed to a completed status on the maintenance information system.

(17) DATE CLOSED—The date of the accounting period end, for the month in which the MR was placed in a completed status.

(18) NUMBER COLUMN—This column indicates the number of permanent transactions charged in each category of charges made to the MR as specified to the far left of the screen, i.e., labor, inventory, material, O/S repair. The labor line is for the maintenance department labor charged to the inquired MR. The inventory line is for the items withdrawn from stores stock to support the maintenance work performed. The material line is the material purchased outside the plant on purchase orders. The O/S repair line is for services of outside vendors requested on purchase orders.

(19) ACTUAL AMOUNT COLUMN—This is the dollar amount charged in each category as specified. This amount also includes temporary charges made during the current accounting period, updated daily (batch).

(20) PLANNED AMOUNT COLUMN—This is the planned amount of dollars to be spent in each category. This amount is entered by the planner of the job. (See No. 9.)

(21) ACTUAL HOURS COLUMN—This is the total amount of labor hours charged to the inquired MR. This amount also includes temporary hours charged during the current accounting period, updated daily (batch).

(22) PLANNED HOURS COLUMN—This is the total amount of labor hours expected to be charged to the inquired MR. This amount is entered by the planner responsive for the job.

(23) OUTSTANDING COMMITMENTS—This is a dollar amount of material or outside repairs which have been received and vouchered but not paid for. At the end of the accounting period in which the voucher is paid, the amount paid will change from a commitment to an actual amount charged.

The purpose of another program, ME1A058, is to provide a means of making inquiries concerning the maintenance labor activity on a maintenance request summarized at the labor group (maintenance organization) level. The program compares the actual hours charged per labor group, with the estimated hours planned for such respective labor group. This program, that is, ME1A058, retrieves the maintenance request root segment and all labor summary segments related to the requested MR number. The information is accumulated and displayed upon the screen reproduced in Document 5.

Document #5

```
       01/14/80       MAINTENANCE REQUEST LABOR SUMMARY     PAGE    1    ME1A05E (1)M. R. NO  223425     (2) TITLE:  RPL P-1 VACUUM PUMP FOR F-1
   (3)                   (6)         (7)        (8)           (9)       (10)
  MAINT   (4)    (5)******ESTIMATED******* ********ACTUAL************
  GROUP  CREW          HOURS        LABOR      HOURS         LABOR     TRANS 2001    4  S        158.30     2,455.71    182.00       2,823.34     26
   3045    1  F                                 9.00         139.63      4

DEPRESS PF1 TO RETURN TO THE MENU
         TOTALS        158.30     2,455.71    191.00       2,962.97     30
                        (11)        (12)       (13)         (14)       (15)
```

The categories of information in Document 5 are defined as follows:

(1) MR NUMBER—This is the maintenance request number inquired.

(2) TITLE—This is a description of the work performed on the MR.

(3) MAINTENANCE GROUP COLUMN—This is the labor group number of the maintenance organization that has worked on the inquired MR. Refer to the labor group table screen for a complete listing of all active labor groups.

(4) CREW SIZE COLUMN—This number indicates the crew size recommended by the planning and scheduling group to be used in performing the amount of work estimated for each respective labor group.

(5) STANDARD OR ESTIMATED COLUMN— This letter indicated whether the estimated hours are from a UMS labor standard (S), or whether the estimated hours are a planner estimate (E).

(6) ESTIMATED HOURS COLUMN—This number is the number of labor hours estimated to be used by each respective labor group listed. The absence of a number indicates none were planned.

(7) ESTIMATED LABOR COLUMN—This number is the planned labor dollars represented by the estimated hours for each respective labor group.

(8) ACTUAL HOURS COLUMN—This number is the number of labor hours actually charged to the maintenance request by each respective labor group listed.

(9) ACTUAL LABOR COLUMN—This number is the amount of labor dollars represented by the actual hours for each respective labor group.

(10) TRANSACTIONS COLUMN—This number is the number of permanent line items of transactions per labor group listed.

(11) ESTIMATED HOURS TOTAL LINE—This is the total number of estimated hours for all labor groups for the maintenance request.

(12) ESTIMATED LABOR TOTAL LINE—This is the total estimated amount in labor dollars for all labor groups for the maintenance request.

(13) ACTUAL HOURS TOTAL LINE—This is the total number of actual hours for all labor groups charged to the maintenance request.

(14) ACTUAL LABOR TOTAL LINE—This is the total actual amount in labor dollars for all labor groups charged to the maintenance request.

(15) TRANSACTIONS TOTAL LINE—This number is the total number of permanent labor transactions for all labor groups charging time to the MR.

Another program, ME1A001, provides a means by which inquiries can be made concerning detail information about the maintenance labor used to support a maintenance request. This program retrieves the MR data base root segment and then retrieves all the detail labor segments belonging to that MR number. Once found, the selected information is formatted and displayed upon the output screen seen in Document 6.

Document #6

```
       01/10/80       DETAIL LABOR - M. R.                    PAGE    2    ME1A001

(1) RECORD  223425    (2) TITLE:  PPL P-1 VACUUM PUMP FOR F-1
    (3)    (4)    (5)     (6)    (7)   (8)      (9)         (10)       (11)
    GROUP  FRMN   DATE    EMPL   ACCT           HOURS       LABOR      ACCTG 20  01  65736  09/27/79  60986  H-90  1    7.00        108.59      79/09
    20  01  65736  09/27/79  60152  H-90  1    7.00        108.59      79/09
    20  01  65736  09/26/79  61169  H-90  1    7.00        108.59      79/09
    20  01  65736  09/26/79  61169  H-90  1    7.00        108.59      79/09
    20  01  65736  09/26/79  60986  H-90  1    7.00        108.59      79/09
    20  01  65736  09/26/79  60152  H-90  1    7.00        108.59      79/09
    20  01  65736  09/25/79  61169  H-90  1    7.00        108.59      79/09
    20  01  65736  09/25/79  61169  H-90  1    7.00        108.59      79/09
    20  01  65736  09/25/79  60986  H-90  1    7.00        108.59      79/09
    20  01  65736  09/25/79  60152  H-90  1    7.00        108.59      79/09
    30  45  60172  10/04/79  60254  H-90  1    3.00         46.54      79/10
    30  45  60172  10/02/79  60458  H-90  1    2.00         31.03      79/10
    30  45  60172  10/02/79  60320  H-90  1    2.00         31.03      79/10
    30  45  60172  09/26/79  61792  H-90  1    2.00         31.03      79/09

DEPRESS PF1 TO RETURN TO THE MENU         (12)        (13)
                                    TOTALS    191.00      2,962.97
```

The categories of information in Document 6 are defined as follows:

(1) RECORD—This is the maintenance request number inquired.

(2) TITLE—This is the description of maintenance work performed on this maintenance request.

(3) GROUP COLUMN—This is the labor group number of the maintenance organization which performed each particular labor transaction.

(4) FOREMAN COLUMN—This is the employee number of the foreman supervising the work performed for each labor transaction.

(5) DATE COLUMN—This is the date each labor transaction listed was performed.

(6) EMPLOYEE COLUMN—This is the clock number of the hourly employee that actually performed the labor transaction listed.

(7) ACCOUNTING CODE COLUMN—This is the account code for the specific transaction listed. H-90 is the capital holding account number, 3325 is the expense account code.

(8) SHIFT COLUMN—This is the rotating shift the labor transaction occurred on.

(9) HOURS COLUMN—This is the actual hours charged for the employee indicated for that shift.

(10) LABOR COLUMN—This is the labor dollars charged at the labor rate per hour per labor group for the corresponding labor hours charged on each line of transaction.

(11) ACCOUNTING COLUMN—This is the labor dollars charged at the labor rate per hour per labor group for the corresponding labor hours charged on each line of transaction.

(12) TOTAL HOURS—This is the total labor hours charged for the inquired MR.

(13) TOTAL LABOR—This is the total labor dollars charged for the inquired MR.

Yet another program dealing with maintenance requests is ME1A002, which provides a means by which inquiries can be made concerning detailed information about the materials withdrawn from inventory and used to support a maintenance request. This program goes against the MR data base root segment and then retrieves all the detail inventory segments belonging to that MR number. Once found, the selected information is formatted and displayed upon the output screen seen in Document 7.

Document #7

```
          01/10/80   DETAIL INVENTORY - M. R.              PAGE    6    METAØØ2

(1)RECORD  223425    (2) TITLE:  RPL P-1 VACUUM PUMP FOR P-1
   (3)      (4)      (5)       (6)   (7)       (8)      (9)            (10)
   FRMN     DATE     STOCK     ACCT  ISSUED    INVENTORY ACCTG         DESCRIPTION 61163  05/25 79   275165    H-90    3 EA      1.14   79 06  NIPPLE, PIPE, CARBON SIZ
   61163  05 25 79   268509    H-90    7 EA     53.92   79 06  FLANGE  PIPE, FORGED CAR
   61163  05 25 79   243569    P-90    2 EA      8.76   79 06  TAPE, 1/2" X 60M" #5025
   61163  05 25 79   195215    H-90   32 EA     17.60   79 06  NUT, HEX, 316 S.S., 3 4=
   61163  05/25 79   195210    H-90   26 EA     10.35   79 06  NUT, HEX, S.S., 5 8=, 71
   61163  05 25 79   195165    P-90   32 EA     45.44   79/06  SCREW, 316 S.S. CAP, 3 4
   61163  05 25 79   195145    H-90   28 EA     15.96   79 06  SCREW, S.S. CAP, N.C. 18

DEPRESS PF1 TO RETURN TO THE MENU             (11)
                                       TOTAL    1,660.05
```

The categories of information in Document 7 are as follows:

(1) RECORD—Maintenance request number inquired.

(2) TITLE—Description of maintenance work performed on this maintenance request.

(3) FOREMAN COLUMN—Employee number of the individual who purchased the inventory from the storeroom.

(4) DATE COLUMN—This is the date of the inventory transaction.

(5) STOCK NUMBER COLUMN—This is the inventory stock number of the item withdrawn from inventory.

(6) ACCOUNTING CODE COLUMN—This is the accounting number charged with the issue. H-90 is the capital holding account, 3325 is the maintenance materials expense account.

(7) ISSUED COLUMN—This is the quantity issued on each respective transaction.

(8) INVENTORY COLUMN—This is the amount of inventory in dollars withdrawn per line.

(9) ACCOUNTING PERIOD COLUMN—This is the accounting period in which the MR was permanently charged with the inventory transaction.

(10) DESCRIPTION COLUMN—This is a brief description of the stock item withdrawn on that line.

(11) TOTAL LINE—This is the total amount of inventory in dollars withdrawn against the inquired MR.

As a further illustration of a representative program and the objectives to be accomplished thereby, reference is made to the program designated ME1A012. This program yields or displays the information of the year-to-date cost center expense summary, that is, the summary of all the expenses charged to a particular cost center by expense type. These totals are further broken out to indicate the source of the charges, it being remembered that there are three sources, namely, direct cost center, direct SUBMOD and direct maintenance request charges. Additionally, information is displayed with respect to the year-to-date maintenance budget and capital expenditures for the particular cost center. Document 8 herein below shows the information resulting from ME1A012 with particular reference to cost center 6210.

Document #8

```
                        COST CENTER EXPENSE SUMMARY        09/19/77   METAØ12

RECORD   V6210      TITLE:  SEQ BULK SOLUTIONS

BUDGET             49,549.02

TOTAL          MAINT REQ       COST CENTER      SUBMOD

LABOR              31,015.55      20,080.20       10,935.35
INVENTORY          24,559.23      18,814.17        5,745.06
MATERIAL            3,122.10       3,122.10
O/S REPAIR          3,728.25       3,728.25

TOTAL              62,425.13      45,724.72       16,680.41

CAPITAL            13,799.03
```

In general terms, one enters the format command for the input screen for module ME1A012 (/FOR MEOCEXP) and depresses the S/R key (ENTER). The desired cost center is entered on the screen and S/R key is depressed. The module -ME1A012 is activated and a fully qualified Segments Search Argument (SSA) is used to retrieve the desired cost center. Once the module determines it has the correct cost center, the desired data fields are added to total areas and are displayed back to the user on the output screen associated with ME1A012. Only one segment, the cost center parent or root segment, is retrieved. All the data needed is on that segment.

Another typical program is ME1A020 entitled "SUBMOD Status for a Cost Center". This program results in showing in detail all SUBMODS which are currently assigned to a cost center. The information includes SUBMOD number, SUBMOD suffix, description, maintenance number, and all assets which make up this SUBMOD. The results of this program are seen in Document 9.

Document #9

```
11/02/78           COST CENTER SUBMOD STATUS         PAGE    2 DISC    MET4020

COST CNTR   VE210   TITLE:  SEO BULK SOLUTIONS

SUBMOD   NUMBER  PAGE MAINT NBR   DESCRIPTION

A3178-134    01  2625              REACTOR V 17 SOLUTION PUMP S
  A3170-126    21  2605   F-2021     HOLDING TANK TRANSFER PUMP
  A3172-148    01  2626   F-2002     HERCULES FILTER E
  A3178-154    01  2605   F-0006     DETA SAFFA TANK CAR UNLOADING PUMP
  A3178-160    01  2623   V-2033     BRINE STORAGE TANK
  A3178-161    01  2623              HORIZ AMMONIA BRINE CHILLER
  A3170-162    01  2603              VERTICAL AMMONIA CONDENSER
  A3172-164    01  2623              HORIZ AMMONIA RECEIVER
  A3172-173    01  2622              CELL 330 SOLUTION SPARKLER FILT V44
  A3170-179    01  2623   I-022C     VERTICAL AMMONIA COOLER
  A3170-160    01  2635   F-234      GAF FILTER F/V-34
  A3178-203    01  2604   V-2017     SOLUTION REACTOR W
  A3170-204    01  2604   V-2217-A   REACTOR E
  A3172-208    21  2604   V-2215-A   DILUTE FORM DROP TANK
  A3170-209    01  2604   V-2226     E D A DROP TANK
  A3170-211    01  2607   E-0007-B   AMMONIA HEAT EXCHANGER

DEPRESS PA1 KEY TO CONTINUE OUTPUT
```

In addition to the typical programs just described, all of which relate to accessing, a typical program that relates to updating is ME1A006, which is entitled "Maintenance Request Addition". This program, briefly stated, simply results in adding a particular maintenance request to that data base.

In connection with program ME1A006, all of the data is entered on a typical screen such as the screen 50 shown in FIG. 2, and then this program is edited thereby for validity and correctness. Thereafter, the maintenance request is added to the data base and all necessary logical relationships are created or established. Also, an audit record is inserted in the audit data base seen in FIG. 13 to furnish the user with an audit trail of all maintenance requests added during the day.

Other preset or preordained programs of a batch nature are not detailed herein, but these will be apparent to those skilled in the art. For example, year-to-date cost center labor charges are handled by a preset program which lists in detail all labor expenses against a cost center. For direct cost center labor, each labor transaction is listed, whereas for direct SUBMOD and direct maintenance request labor, the summary record contains only total labor charges associated with that particular SUBMOD or maintenance request. Other routine programs are daily batch programs, as well as weekly, monthly and annular batch programs. As illustrative of a monthly batch program, there will be seen the results from program MEOM001 by way of a printed report designated Document 10.

Document #10

In accordance with such program, the monthly maintenance labor by maintenance request is given for the month ending December 30, 1977; that is to say, the details for the maintenance request number 1050050 are broken down according to the foreman in charge, the various employees, the dates worked by them, the maintenance group, the hours worked and the total labor charges by individual.

A more complex example of a program or series of programs for fully exploiting the capabilities of the present system may be appreciated by referring back to FIG. 20. This example starts in the center of the diagram, seen in FIG. 20, at the SUBMOD data base. The SUBMOD (equipment grouping) is essentially the functional center around which essentially all maintenance activity revolves. Technical data storage, inventory management, labor backlog control and time accounting, and maintenance cost reporting at various levels are but a few of the functions involved.

The equipment grouping consists of separate individual pieces of equipment which are assigned a fixed asset number on the corporate asset accounting system. Location of service is incorporated into the SUBMOD numbering system, and can be identified on plant equipment layout drawings.

For convenience here, the various screen formats resulting from the series of programs are reproduced as Documents 11-19. Screen format (1) MEOSSTAT provides a listing of a SUBMOD and all of its related assets. Technical data or specifications relating to each asset is available on screen format (2) MEOSPEC. Other related asset information is also available in the data base.

An integral part of equipment maintenance is the availability of repair parts, and parts information. Since each asset is manufactured by some manufacturer, all like assets can be grouped together in a single category, or manufacturers code. Therefore, a direct relationship between asset, manufacturer, and repair parts can be established to provide a useful tool for information required by field personnel. Screen format (3) MEOAPART provides repair parts information by asset number. When a repair part is unique to a particular service, and properly identified by SUBMOD, the difficulty of proper parts selection can be reduced.

The acquisition, storage, and timely availability of these repair parts is also an integral part of the maintenance performed on equipment groupings. The inventory data base performs this function. A record of each inventory transaction is maintained, and provides historical data for inventory management and control. Screen format (4) MEOISTA1 provides a listing of the current status of a particular stock item. Format (5) MEOIUSE1 provides usage information for controlling proper stocking levels. The inventory system also provides the input for inventory expenditures for maintenance cost reporting.

Written requests for work to maintain SUBMODS (equipment groupings) or perform any other maintenance work are entered into the maintenance request data base. Screen format (6) MEOMSTAT displays the status of a specific maintenance request, and is one of many screens in the system which provides information used for maintenance management. These functions include: consolidation of work on equipment groupings to minimize downtime, backlog development for work load identification and manpower control, advance material acquisition, planning and scheduling of work, and maintenance cost reporting. As maintenance charges are made to maintenance requests in labor, inventory, material and outside repairs, cost data is developed relative to the SUBMODS which they support. This cost data is used for economic evaluation of equipment service performance. Screen format (7) MEOSEXP displays the maintenance expenses for a specific SUBMOD for managerial review.

Higher levels of management are concerned not only with individual SUBMOD performance, but the consolidated effect of many SUBMODS used in an entire production process. Therefore, each SUBMOD is linked to a cost center for cost reporting purposes. This information is summarized on screen format (8) MEOCEXP. Also provided is an expense budgeting system for performance evaluation and control.

For upper management's evaluation and control, cost center information is further summarized at the production area level. Budget information is also summarized at this level. Screen format (9) MEOCARY provides this information.

Document #11

```
03/05/80            SUBMOD STATUS              PAGE  1  META029

SUBMCD A3350-113    TITLE:  PNTSA SOLUTION TRANSFER PUMP  I

COST CNTR  V3110   REPEAT CODE  12

ORIGINAL COST              REPLACEMENT COST

SUFX PAGE MAINT NBR    MOTOR    PUMP    SP RDR    FAN    EQUIP 01  1702  P-2721-A   400-1312
  01  1702  P-2721-A              614-1820

DEPRESS PF3 TO RETURN TO THE MENU
```

Document #12

```
03/05/80            PUMP DATA SHEET             PAGE   1   META095
                                                         11:06:27

ASSET  614-1820  DESC  PUMP, WORTHINGTON, BPO-B FRAME 3 X 2 X 8
MFR KEY  W620-6101-0204   SUBMOD KEY  A3350-113   01
PO            DATE         COST              PROJECT

SERIAL  A-138923          MODEL  BPO              HP
TYPE  B-FRAME             SIZE   3 X 2 X 8        RPM
GPM  65                   FOOT HEAD  125   TEMP        VISC
SP GRAV       LIQUID                   CURVE
DRAWING                              GASKET THICKNESS
IMPELLER  MATL  WORTHITE          RING MATL
          ROTATION  CW    PATTERN             CLEARANCE
          DIA  8         MAX DIA  8           MIN DIA
STUFFING BOX  MFR NBR  NA           MFR  NA
              DIA  NA               SHAFT DIA  1 3/8    NBR RINGS
              PACK SIZE  NA
CASING:  MATL  WORTHITE           RING MATL
SHAFT:   MATL  316SS                   SLEEVE MATL  316SS
RADIAL BRG:  TYPE                 SIZE
THRUST BRG:  TYPE                 SIZE
COUPLING:  BORE                   SIZE
DEPRESS PF1 TO RETURN TO THE MENU
```

Document #13

```
SM                  ASSET PARTS LIST          PAGE   1   META486
                                                     03/05/80 11:15:19

ASSET  614-1820  SUBMCD  A3350-113    MFR KEY  W620-6101-0204   CODE  02

DESC  PUMP, WORTHINGTON, BPO-B FRAME 3 X 2 X 8

REFR   STOCK   REQD  DESCRIPTION                                  ON HAND 614975    1  BASEPLATE, CAST IRON, 9" X 42 1/2" ANCHOR SPACING   1
       01 FOR 143 THRU 215 MOTOR FRAMES, TAPPED FOR PUMP, NOT MOTOR
       614976    1  BASEPLATE, CAST IRON, 12" X 49 1/2" ANCHOR SPACING  1
       01 FOR 254 THRU 286 MOTOR FRAMES, TAPPED FOR PUMP, NOT MOTOR
       614977    1  BASEPLATE, CAST IRON, 15" X 55 1/2" ANCHOR SPACING  1
       01 FOR 324 THRU 365 MOTOR FRAMES, TAPPED FOR PUMP, NOT MOTOR
  1    614989    1  CASING, WORTHITE                                    3
  1    614995    1  CASING, DUCTILE IRON                                2
  2    615065    1  IMPELLER, DUCTILE IRON, 8"                          1
  2    615070    1  IMPELLER, DUCTILE IRON, 9 1/2"                      0
  2    615094    1  IMPELLER, WORTHITE, 6 1/2                           1
  2    615095    1  IMPELLER, WORTHITE, 6 3/4                           1
  2    615098    1  IMPELLER, WORTHITE, 7 1/4                           2
  2    615099    1  IMPELLER, WORTHITE, 7 1/2                           1
DEPRESS PF1 TO RETURN TO THE MENU
DEPRESS PA1 KEY TO CONTINUE OUTPUT
```

Document #13 (Continued)

```
SM                              ASSET PARTS LIST                    PAGE    2   META086
                                                                    23/05/80  11:15:29
ASSET  614-1820  SUBMOD  A3350-113    MFR KEY  W620-6101-0204  CODE  02

DESC  PUMP. WORTHINGTON. BPO-B FRAME 3 X 2 X 8

REFR   STOCK    REQD  DESCRIPTION                                              ON HAND
    2   615100      1   IMPELLER. WORTHITE. 8                                         4
    2   615101      1   IMPELLER. WORTHITE. 7 3/4                                     1
    2   615105      1   IMPELLER. WORTHITE. 9 1/2                                     2
    2   615109      1   IMPELLER. WORTHITE. 9 1/4                                     0
    6   615230X         SHAFT SOLID. 316SS NO SLEEVE DESIGN                          15
       01 1 3/8" DIA THRU STUFF BOX
   11   615005         COVER, STUFFING BOX. DUCTILE IRON                              1
   11   615007         COVER, STUFFING BOX. WORTHITE                                  0
   11A  615199         CLAMPING RING                                                  2
   13   228350         PACKING. 5/16" SQUARE                                          0
       01 INTERLOCK BRAIDED WHITE ASBESTOS. TEFLON IMPREGNATED. OIL LUBE
       02 FOR CAUSTICS & WEAK ACIDS, J.M. #C-2009, SEPCO # ML-2225 OR EQ.
   13   228353         PACKING. 5/16" SQUARE                                          4
       01 INTERLOCK BRAIDED TEFLON. FIBER YARN, SEPCO #2225 OR EQ.
DEPRESS PF1 TO RETURN TO THE MENU
DEPRESS PA1 KEY TO CONTINUE OUTPUT

SM                              ASSET PARTS LIST                    PAGE    3   META086
                                                                    03/05/80  11:15:52
ASSET  614-1820  SUBMOD  A3350-113    MFR KEY  W620-6101-0204  CODE  02

DESC  PUMP. WORTHINGTON. BPO-B FRAME 3 X 2 X 8

REFR   STOCK    REQD  DESCRIPTION                                              ON HAND
   14   615270         SLEEVE, SHAFT WORTHITE, HOOK TYPE, WITH GASKET                 2
   14   615280         SLEEVE. SHAFT. 416SS. 17% CHROME, WITH "C" RING                6
   14A  N33220         KEY, SHAFT SLEEVE 3/16  316SS                                  6
   16   170260         BEARING, INBOARD, 207K FAFNIR OR EQ.                          17
   17   616410         GLAND. PACKING                                                 2
   17A  605620         GLANDPLATE. FOR 1 3/8 DURASEAL. TYPE BOTT. 316SS               3
       01 GLAND RING. 4" OD X 2 1/2 ID, FOR CLAMP IN SEAT. 4 HOLES 3 1/4" B.C.
   17B  616690         STUD, GLAND                                                    0
   17C  195200         NUT, GLAND STUD                                            2,368
   18   170445         BEARING, OUTBRD.                                               1
   19   615025X        FRAME SUB-ASSEMBLY. BPC-B WITH 316SS SHAFT                     6
   22   178040         LOCKNUT, BEARING #N-07                                         5
   22   178235         LOCKWASHER. BEARING #W-07                                      6
   22   615160         RING. SNAP. BEARING                                           39
DEPRESS PF1 TO RETURN TO THE MENU
DEPRESS PA1 KEY TO CONTINUE OUTPUT

SM                              ASSET PARTS LIST                    PAGE    4   META086
                                                                    03/05/80  11:16:02
ASSET  614-1820  SUBMOD  A3350-113    MFR KEY  W620-6101-0204  CODE  02

DESC  PUMP. WORTHINGTON. BPO-B FRAME 3 X 2 X 8

REFR   STOCK    REQD  DESCRIPTION                                              ON HAND
   24   615149         NUT, IMPELLER. WORTHITE                                        7
   24A  615322         WASHER. IMPELLER NUT                                           0
   29   616675         LANTERN RING                                                   4
   32   N33220         KEY, IMPELLER 3/16                                             6
   35   615017         COVER. BEARING. INBOARD                                       11
   35A  615202         SCREW FLAT HEAD. MACHINE. INBOARD BEARING COVER               39
   38   615043         SLEEVE. FOR HOOK TYPE SLEEVES                                 15
   38   615196         O-RING, SLEEVE. BUNA RUBBER                                   13
   40   615010         DEFLECTOR                                                     35
   45   615021         CAP. VENT BEARING HOUSING                                     29
   47   615205         SEAL. OIL. INBOARD BEARING COVER                              57
   53A  N11700         FRAME SUPPORT. INB.                                          200
   53B  615320         FRAME SUPPORT. OUTBOARD                                        3
   60   615195         OIL RING                                                      23
DEPRESS PF1 TO RETURN TO THE MENU
DEPRESS PA1 KEY TO CONTINUE OUTPUT
```

Document #13 (Continued)

```
SM                       ASSET PARTS LIST              PAGE   5   META086
                                                       03/05/80 11:16:29
ASSET  614-1820  SUBMOD  A3350-113    MFR KEY  W620-6101-0204  CODE  02

DESC  PUMP, WORTHINGTON, BPO-B FRAME 3 X 2 X 8

RFFR  STOCK    RFOD DESCRIPTION                                  ON HAND 60A  615002       COLLAR, OIL RING                                  29
   65   605780       SEAT, STATIONARY, INSERT, 1 3/8 DURASEAL          19
    01 TYPE POTT, CARBON, CLAMP IN TYPE 2 1/4" OD X 1 1/16" LONG
   66   615204       SCREW, SHAFT ADJUSTING                            33
   69   615155       SNAP RING, BEARING HOUSING                        54
   73   615045       GASKET, CASING                                    32
   73A  615035       BEARING COVER, INBOARD.                           43
   73D  615240       SHIMS, .005"                                      22
   73E  615245       SHIMS, .010"                                       8
   73F  615250       SHIMS, .015"                                      31
   77   220736       OILER, CONSTANT LEVEL, PLASTIC BOTTLE, 4 OZ. CAP. 16
   77   220788       BOTTLE, OILER, PLASTIC, 4 OZ CAP                  12
   80   605460X      SEAL, HEAD, ROTARY UNIT, 1 3/8 J. CRANE           10
    01 TYPE OT, CODE OP-1-1, TEFLON-CARBON 316SS
DEPRESS PF1 TO RETURN TO THE MENU
DEPRESS PA1 KEY TO CONTINUE OUTPUT

SM                       ASSET PARTS LIST              PAGE   6   META086
                                                       03/05/80 11:16:27
ASSET  614-1820  SUBMOD  A3350-113    MFR KEY  W620-6101-0204  CODE  02

DESC  PUMP, WORTHINGTON, BPO-B FRAME 3 X 2 X 8

RFFR  STOCK    RFOD DESCRIPTION                                  ON HAND 80   605810       RING, TEFLON, SHAFT PACKING, FOR 1 3/8 DURASEAL   55
   80   605830X      UNIT, COMPRESSION, ROTARY, 316SS, 1 3/8 DURASEAL  24
    01 TYPE ROTT
   80   605890X      FACE, ROTARY, SEAL RING, FOR 1 3/8 DURASEAL       38
    01 SOLID TUNGSTEN CARBIDE, TYPE ROTT
   99   615057       HOUSING, BEARING, OUTBOARD                         4
   99A  615150       O-RING, BRNG. HSG.                                38
   99B  615022       CAPSCREW, BEARING HOUSING, OUTBOARD, NYLOK        18
   169  615215       SEAL, OIL BEARING HOUSING, OUTBOARD               55

DEPRESS PF1 TO RETURN TO THE MENU
```

Document #14

```
03/05/80            MAINTENANCE INVENTORY STATUS NO1              META422
11:20:45

STOCK NO 172262       UOM EA   DESCRIPTION BEARING, 207 X FAFNIR OR EQUAL

CAT MAINTENANCE  REP.-ITEM     *LEAD-TIME *AVG-NEW  11 *AVG-REP    EOQ
PERISH    CAP-TYP F INV-TYPE X SEASON   USAGE A3 CLASS N  RFC-AREA 21
COMMODITY 223    BUYER P  INDEX         SAFETY     DELETE DATE
ON ORDER            OUT FOR REPAIR      JOB PACKAGE        ISSUE OUT

CTY                 LST ISSU  ROLL12 YTDISSU    UNIT
         LOCATION   AVAIL   MIN   MAX   *DELETE   ISSUES RETURNS    PRICE
CENT STORE 1S-F-10-0  17     15    30   02-27-80    280             2.6500

DEPRESS PF1 TO RETURN TO THE MENU
```

Document #15

```
03/05/80             MAINTENANCE INVENTORY CURRENT YEAR USAGE              META410
 11:21:06
STOCK NO. 170260    DESC. BEARING. 207 K FAFNIR OR EQUAL    YTD RECEIPTS    64

CENT                                          TOTAL   TOTAL   NET TOT
        STORE                                         ISSUES  RETURNS ISSUES

JAN   71                                              71
  FEB   62                                              62
  MAR
  APR
  MAY
  JUN
  JUL
  AUG
  SEP
  OCT
  NOV
  DEC

TOT  133                                             133             133

DEPRESS PF1 TO RETURN TO THE MENU
```

Document #16

```
         03/05/80           MAINTENANCE REQUEST STATUS                    META300

M R NO   515261     TITLE    REP. P-221A PUMP              CONTROL NO.  444445

COST CNTR [V3110]  PROJECT                 SUBMOD [A3350113]   ASSET [6141620]

PRIORITY  00  ANALYST  17  MAINT TYPE  14   AREA CODE

STATUS CLOSED    DATE WRTN  02-19-80  DATE RECD  02-23-80  DATE OPEN 02-22-80
                 DATE COMP  02-22-80  DATE CLSD  02-22-80

ACTUAL         PLANNED         ACTUAL        PLANNED
              NUMBER     AMOUNT         AMOUNT          HOURS         HOURS

LABOR            4        69.68          62.72            4.00          3.60
INVENTORY        9       540.65
MATERIAL
O/S REPAIR

TOTAL                  [610.33]          62.72

C S COMMIT
DEPRESS PF 1 TO RETURN TO THE MENU
```

Document #17

```
            SUBMOD EXPENSE SUMMARY - YEAR TO DATE    03/05/80    META325

RECORD  A3350-113     TITLE:  PNISA SOLUTION TRANSFER PUMP (E.

COST CNTR [V3110]

TOTAL         MAINT REQ        SUBMOD

LABOR         69.68           69.68
INVENTORY    540.65          540.65
MATERIAL
O/S REPAIR

TOTAL        610.33         [610.33]

PAST YEARS   431.60         2,136.25         1,635.64
             YEAR=1979      YEAR=1978        YEAR=1977

DEPRESS PF1 TO RETURN TO THE MENU
```

Document #18

COST CENTER EXPENSE SUMMARY - YEAR TO DATE   03/05/80   MS1A012

RECORD V3110    TITLE: PNTSA PRODUCTION

BUDGET   | 52,850.00 |

|          | TOTAL     | MAINT BFC | COST CENTER | SUBMCT   |
|----------|-----------|-----------|-------------|----------|
| LABOR    | 14,752.80 | 9,569.59  | 174.22      | 5,008.99 |
| INVENTORY| 11,327.16 | 8,139.42  | 99.30       | 2,058.44 |
| MATERIAL | 4,106.09  | 4,106.09  |             |          |
| O/S REPAIR| 467.65   | 467.65    |             |          |
| TOTAL    | 30,646.70 | 23,275.75 | 273.52      | 7,097.43 |

CAPITAL   5,351.98

DEPRESS PF2 TO RETURN TO THE MENU

Document #19

AREA EXPENSE SUMMARY - YEAR TO DATE   PAGE  1   MS1A055
                                              03/05/80

AREA CODE  09  TITLE: RES 1

| CC    | TITLE                          | TOTAL     | BUDGET    |
|-------|--------------------------------|-----------|-----------|
| E9225 | CAPITAL EXPEND-MAINT. RES 1    | 15,364.55 | 23,276.00 |
| V3100 | RES AREA 9 O'HEAD              |           | 6,454.00  |
| V3101 | RES AREA 9-GENERAL EQUIPMENT   | 31,486.73 | 12,424.00 |
| V3108 | RES 9 AIR ABATE                | 295.28    | 636.00    |
| V3109 | RES 9 WATER ABATE              | 815.09    | 174.00    |
| V3110 | PNTSA PRODUCTION               | 30,646.70 | 52,850.00 |
| V3120 | PNSSA PRODUCTION               | 2,385.53  |           |
| V3121 | PNSSA GROUP 1                  | 7,561.22  | 512.00    |
| V3122 | DMSO                           | 1,780.49  | 174.00    |
| V3123 | PASSA GROUP 1                  | 361.52    | 66.00     |
| V3124 | PNSSA GROUP 3                  | 34.85     | 512.00    |
| V3125 | PNSSA GROUP 4                  | 4,407.77  | 512.00    |
| V3126 | PNSSA GROUP 5                  |           | 512.00    |
| V3127 | PNSSA GROUP 6                  | 1,217.46  | 512.00    |

DEPRESS PF2 TO RETURN TO THE MENU
DEPRESS PA1 KEY TO CONTINUE OUTPUT

AREA EXPENSE SUMMARY - YEAR TO DATE   PAGE  2   MS1A056
                                              03/05/80

AREA CODE  09  TITLE: RES 1

| CC    | TITLE              | TOTAL     | BUDGET    |
|-------|--------------------|-----------|-----------|
| V3130 | PASSA PRODUCTION   | 43.55     |           |
| V3131 | PASSA GROUP 2      |           | 65.00     |
| V3140 | DNS PRODUCTION     | 1,522.53  |           |
| V3141 | DNS GROUP 1        | 20,712.38 | 8,168.00  |
| V3142 | BLEACH             | 5,621.81  | 3,114.00  |
| V3150 | DAS PRODUCTION     | 2,361.15  |           |
| V3151 | DAS GROUP 1        | 15,752.67 | 7,198.00  |
| V3152 | DAS GROUP 2        | 4,469.12  | 7,198.00  |
| V3153 | DAS GROUP 3        |           | 7,198.00  |
| V3170 | SCRPIT PRODUCTION  |           |           |

```
              CAPITAL TOTAL   15,364.55   23,076.00
              EXPENSE TOTAL  131,262.43  112,736.00
DEPRESS PF2 TO RETURN TO THE MENU
              TOTAL        = 146,626.98  135,812.00
```

There has been disclosed herein a plant maintenance control system uniquely adapted, because of the organization and arrangement of the individual data bases, to provide multiple access to the stored data, through appropriate programming, so as to effectuate the needed control over maintenance expenses. The primary result of this is the timely availability of detailed information with respect to current demand for services, relative priority of individual jobs, identification of required materials and their availability, as well as the craft requirements needed and their availability. The system thus effectively solves the difficulties inherent in the increased size and complexity of modern plant maintenance operations.

While there have been shown and described what are considered at present to be the preferred and alternate embodiments of the present invention, it will be appreciated by those skilled in the art that modifications of such embodiments may be made. It is therefore desired that the invention not be limited to these embodiments, and it is intended to cover in the appended claims all such modifications as fall within the true spirit and scope of the invention.

What is claimed is:

1. A plant maintenance control method by which control over maintenance expenses is established through a computer data base system, said method comprising:

providing a data base complex having at least four complete, non-redundant, individual data bases, each data base being composed of a plurality of data base records each of which is adapted to contain data in a hierarchical structure comprising a root segment and dependent or subordinate segments, establishing logical pointer relationships between at least said first data base and each of said other three data bases;

routing data through said computer to and from said data base complex;

accessing data from said individual data bases by searching segments selectively in each of the data bases based on a preordained selection method and in accordance with said established logical pointer relationships.

2. A plant maintenance control system in which control over expenses is established through a computer data base system, said system comprising:

a computer;

a data base complex having at least four individual data bases, each containing data in a hierarchical structure, each of said hierarchical structures comprising a root segment and dependent or subordinate segments;

the first data base containing data with respect to maintenance requests for maintenance work to be performed on equipment in said plant; the second data base containing data with respect to the project to which the maintenance work is assigned; the third data base containing data with respect to the cost center responsible for particular maintenance requests; the fourth data base, submod, containing data as to functional groupings of equipment;

a plurality of terminal devices for routing data through said computer to and from said data base complex;

means for establishing logical pointer relationships between at least said first data base and each of said other three data bases respectively;

means for accessing data from the individual data bases by searching said segments selectively in each of the data bases based on a preordained selection method in accordance with said established logical pointer relationships.

3. A system as defined in claim 2, further comprising means for establishing a logical pointer relationship between said cost center data base and said submod data base.

4. A system as defined in claim 3 in which two additional data bases are included: a table data base and a foreman data base.

5. A system as defined in claim 4, further including an asset data base, and means for establishing logical pointer relationships between said asset data base and said maintenance request data base.

6. A system as defined in claim 5, further including a manufacturers table data base, and means for establishing a logical pointer relationship between said manufacturers table base and said asset data base.

7. A system as defined in claim 6, further including a maintenance inventory data base, and means for establishing a logical pointer relationship between said maintenance inventory data base and said manufacturers table data base.

8. A system as defined in claim 7, further including a sub-assembly data base, and means for establishing logical pointer relationships between said sub-assembly data base and said manufacturers table data base and maintenance inventory data base respectively.

9. A system as defined in claim 8, further including a buyer data base.

10. A system as defined in claim 9, further including a vendor data base, and means for establishing a logical pointer relationship between said vendor data base and said maintenance inventory data base.

11. A system as defined in claim 10, further including a commodity data base, and means for establishing logical pointer relationships between said commodity data base and said vendor data base, said maintenance inventory data base, and said buyer data base respectively.

12. A system as defined in claim 11, further including a purchase order data base, and means for establishing logical pointer relationships between said purchase order data base and said vendor data base, said buyer data base, said maintenance inventory data base, and said maintenance request data base.

13. A system as defined in claim 12, further including an audit data base.

14. A system as defined in claim 13, further including an inventory index data base, and means for establishing a logical pointer relationship between said inventory index data base and said maintenance inventory data base.

15. A system as defined in claim 2, in which said terminal devices accept data from input source documents containing data as to the maintenance request, cost center, project, service number and asset number.

16. A system as defined in claim 15, in which a source document provides data with respect to the maintenance request number and the like, and further provides data as to the work to be performed on a particular piece of equipment, the problem encountered with the equipment, and the part or parts involved.

17. A system as defined in claim 16, including means for recording the maintenance request data in detail with respect to labor, storeroom issues, outside materials, outside repair, outstanding commitments.

18. A system as defined in claim 2, in which each of said logical pointer relationships is established between a particular subordinate segment in one data base and the root segment of another data base.

* * * * *